United States Patent
Gupta et al.

(10) Patent No.: US 12,106,269 B2
(45) Date of Patent: Oct. 1, 2024

(54) VIDEO CONFERENCING INTERFACE FOR ANALYZING AND VISUALIZING ISSUE AND TASK PROGRESS MANAGED BY AN ISSUE TRACKING SYSTEM

(71) Applicants: Atlassian Pty Ltd., Sydney (AU); Atlassian Inc., San Francisco, CA (US)

(72) Inventors: Vishesh Gupta, New Delhi (IN); Samartha Vashishtha, Noida (IN)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 510 days.

(21) Appl. No.: 17/412,633

(22) Filed: Aug. 26, 2021

(65) Prior Publication Data

US 2022/0207489 A1    Jun. 30, 2022

Related U.S. Application Data

(63) Continuation-in-part of application No. 17/137,232, filed on Dec. 29, 2020, now Pat. No. 11,153,532.

(51) Int. Cl.
| | |
|---|---|
| *G06Q 10/101* | (2023.01) |
| *G06Q 10/0631* | (2023.01) |
| *G06Q 10/1093* | (2023.01) |
| *H04N 7/15* | (2006.01) |

(52) U.S. Cl.
CPC .  *G06Q 10/1095* (2013.01); *G06Q 10/063114* (2013.01); *H04N 7/15* (2013.01)

(58) Field of Classification Search
CPC .... G06F 3/0484; G06F 3/167; G06F 11/3664; G06F 16/9035; G06F 40/205; G06N 3/006; G06N 3/044; G06Q 10/063114; G06Q 10/0639; G06Q 10/103; G06Q 10/1095; G06Q 30/0282; G10L 15/26; G10L 15/22; G11B 27/034; H04L 51/222; H04L 65/4038; H04L 67/55; H04N 7/15; H04N 7/155

See application file for complete search history.

(56) References Cited

U.S. PATENT DOCUMENTS

| | | |
|---|---|---|
| 5,617,539 A | 4/1997 | Ludwig et al. |
| 5,999,208 A | 12/1999 | McNerney et al. |
| 7,185,054 B1 | 2/2007 | Ludwig et al. |

(Continued)

*Primary Examiner* — Gerald Gauthier
(74) *Attorney, Agent, or Firm* — Brownstein Hyatt Farber Schreck, LLP

(57) ABSTRACT

Systems for capturing and organizing team-generated content produced during a meeting defined/facilitated by a third-party meeting tool or service. In particular, a server system includes a memory allocation and a processor allocation configured to cooperate to instantiate an instance of a bridge service configured to communicably couple to API endpoints of the third-party meeting tool and to one or more collaboration tools. The bridge service can use meeting data obtained from a third-party meeting tool to obtain task information from a task management system for task associated with a current meeting being hosted by the third-party meeting tool. The bridge service can analyze the task information to determine a status of the tasks, and generate graphical summaries of the task associated with the event. The graphical summaries can be displayed to participants of the current meeting.

17 Claims, 11 Drawing Sheets

(56) References Cited

U.S. PATENT DOCUMENTS

| | | | |
|---|---|---|---|
| 7,358,985 B2* | 4/2008 | Uchihashi | H04N 7/15 |
| | | | 348/E7.083 |
| 7,466,334 B1* | 12/2008 | Baba | G11B 27/034 |
| | | | 348/E7.083 |
| 10,297,255 B2* | 5/2019 | Jacobson | G10L 15/22 |
| 10,423,948 B1 | 9/2019 | Wilson et al. | |
| 10,810,574 B1 | 10/2020 | Wilson et al. | |
| 11,153,532 B1 | 10/2021 | Gupta et al. | |
| 11,599,855 B1* | 3/2023 | Pelz | G06Q 10/063114 |
| 2004/0216039 A1 | 10/2004 | Lane | |
| 2005/0062844 A1 | 3/2005 | Ferren | |
| 2006/0010197 A1 | 1/2006 | Ovenden | |
| 2006/0085245 A1 | 4/2006 | Takatsuka et al. | |
| 2008/0015880 A1 | 1/2008 | Freedenberg et al. | |
| 2008/0065460 A1* | 3/2008 | Raynor | G06Q 10/063114 |
| | | | 705/7.15 |
| 2008/0303949 A1 | 12/2008 | Ciudad et al. | |
| 2012/0274730 A1 | 11/2012 | Shanmukhadas et al. | |
| 2012/0304079 A1 | 11/2012 | Rideout et al. | |
| 2013/0007122 A1 | 1/2013 | Su et al. | |
| 2013/0169733 A1 | 7/2013 | Jang et al. | |
| 2013/0197967 A1 | 8/2013 | Pinto et al. | |
| 2014/0176665 A1 | 6/2014 | Gottlieb et al. | |
| 2014/0184720 A1 | 7/2014 | Dasgupta et al. | |
| 2014/0188814 A1 | 7/2014 | Venkatrao et al. | |
| 2014/0285614 A1 | 9/2014 | Epstein et al. | |
| 2014/0333713 A1 | 11/2014 | Shoemake et al. | |
| 2015/0213411 A1* | 7/2015 | Swanson | G06Q 10/103 |
| | | | 705/301 |
| 2015/0237303 A1 | 8/2015 | Thapliyal et al. | |
| 2015/0295877 A1* | 10/2015 | Roman | H04L 67/55 |
| | | | 709/203 |
| 2015/0350258 A1 | 12/2015 | Griffin et al. | |
| 2016/0246769 A1 | 8/2016 | Screen et al. | |
| 2016/0294744 A1 | 10/2016 | Zou et al. | |
| 2016/0337213 A1 | 11/2016 | Deutsch et al. | |
| 2017/0006160 A1 | 1/2017 | Marya et al. | |
| 2017/0041259 A1 | 2/2017 | Tao et al. | |
| 2017/0099361 A1 | 4/2017 | Digilov et al. | |
| 2017/0116552 A1* | 4/2017 | Deodhar | G06Q 10/0639 |
| 2017/0169383 A1* | 6/2017 | Schmidt | G06Q 10/063114 |
| 2017/0279862 A1* | 9/2017 | Bader-Natal | H04L 65/4038 |
| 2017/0310716 A1* | 10/2017 | Lopez Venegas | |
| | | | G06Q 10/1093 |
| 2017/0310826 A1 | 10/2017 | Gunasekar et al. | |
| 2018/0007103 A1 | 1/2018 | Levin et al. | |
| 2018/0060793 A1* | 3/2018 | Sama | G06N 3/044 |
| 2018/0063480 A1 | 3/2018 | Luks et al. | |
| 2018/0211223 A1* | 7/2018 | Jacobson | G10L 15/26 |
| 2018/0240077 A1* | 8/2018 | Sharma | G06Q 10/1095 |
| 2018/0375806 A1 | 12/2018 | Manning et al. | |
| 2019/0028520 A1* | 1/2019 | Nawrocki | G06F 40/205 |
| 2019/0042988 A1 | 2/2019 | Brown et al. | |
| 2019/0050812 A1* | 2/2019 | Boileau | G06F 3/0484 |
| 2019/0379712 A1 | 12/2019 | Mota et al. | |
| 2020/0104802 A1* | 4/2020 | Kundu | G06F 16/9035 |
| 2020/0193389 A1* | 6/2020 | Lagares-Greenblatt | |
| | | | G06Q 10/063114 |
| 2020/0228358 A1* | 7/2020 | Rampton | G06N 3/006 |
| 2021/0056515 A1* | 2/2021 | Misra | G06Q 30/0282 |
| 2021/0081459 A1 | 3/2021 | Chung et al. | |
| 2021/0168177 A1* | 6/2021 | Henderson | G06F 3/167 |
| 2021/0209540 A1* | 7/2021 | Bhide | H04L 51/222 |
| 2022/0182425 A1 | 6/2022 | Braganza et al. | |
| 2022/0207489 A1* | 6/2022 | Gupta | H04N 7/15 |
| 2022/0210372 A1 | 6/2022 | Gupta et al. | |
| 2023/0145461 A1* | 5/2023 | Templeton | G06F 11/3664 |
| | | | 705/7.15 |

* cited by examiner

VIDEO CONFERENCING INTERFACE FOR ANALYZING AND VISUALIZING ISSUE AND TASK PROGRESS MANAGED BY AN ISSUE TRACKING SYSTEM

CROSS-REFERENCE TO RELATED APPLICATION(S)

This application is a continuation-in-part patent application of U.S. patent application Ser. No. 17/137,232, filed Dec. 29, 2020 and titled "Capturing and Organizing Team-Generated Content into a Collaborative Work Environment," the disclosure of which is hereby incorporated herein by reference in its entirety.

FIELD

Embodiments described herein relate to collaborative work environments and, in particular, to substantially automated systems and methods for aggregating, securely storing, and/or controlling access to information generated, shared, referenced, attached, derived, inferred, or discussed by a team (herein "team-generated content") when operating a third-party meeting service.

More specifically, embodiments described herein relate to systems and methods configured to leverage an application programming interface ("API") endpoint of the third-party meeting service to extract team-generated content during a meeting, select a collaboration tool and an API endpoint thereof based on the team-generated content, and to input the team-generated content and/or metadata thereof to the selected collaboration tool. Embodiments described herein also relate to systems and methods configured to leverage an application programming interface ("API") endpoint of the third-party meeting service to retrieve information related to a meeting, retrieve task information managed by a task management program, and display information related to tasks in the third-party meeting service.

BACKGROUND

An organization can establish a collaborative work environment by self-hosting, or providing its employees with access to, one or more platforms or services to facilitate cooperation and completion of work related to common goals. In many cases, a collaborative work environment is defined by multiple purpose-configured collaboration tools (e.g., issue tracking systems, documentation systems, code repository systems, and so on), which may be leveraged by teams to share information.

In addition, teams may use one or more third-party or first-party meeting tools, such as a videoconferencing platform, for meetings. Often, at least one attendee of a meeting is tasked with collecting meeting nodes, memorializing discussion, and generating input to one or more collaboration tools used by the team. In many cases, however, attendees tasked with notetaking are unable to participate in the meeting a meaningful manner while also capturing comprehensive nodes. Moreover, tasks that are discussed or assigned during a meeting may be tracked in by a separate collaboration tool requiring users to independently access that collaboration tool to check on and/or update the status of various tasks.

SUMMARY

Embodiments described herein take the form of a server system including at least a memory allocation defined by a data store storing an executable asset and a working memory allocation.

The server system includes a processor allocation configured to load the executable asset from the data store into the working memory to instantiate an instance of a bridge service configured to: communicably couple to an application programming interface (API) endpoint of a third-party service; communicably couple to a collaboration tool service; select, from the data store, a user interaction schema associated with the collaboration tool service; receive a user input event from the API endpoint of the third-party service; extract a user input from the user input event; provide the user input as input to an input type classifier; and receive as output from the input type classifier an input type.

In response to determining that the input type is an ignored input type, the bridge service rejects the user input. Alternatively, the bridge service may determine that the input type is a captured input type. In response, the bridge service advances to validate the user input against the user interaction schema and, in response to successful validation of the user input, generate an API request object with the user input and provide the API request object as input to the collaboration tool service.

Certain embodiments described herein take the form of a method of operating an instance of a bridge service configured to parse real-time data from a third-party meeting service as input to a collaboration tool. In many implementations, the method includes the operations of: accessing, by the bridge service, a first application programming interface (API) endpoint of the third-party meeting service during an event defined by the third-party meeting service; receiving an input event from the first API endpoint; obtaining metadata of the event from the third-party meeting service; providing the input event as input to an input classifier; receiving an input type as output from the input classifier; selecting a second API endpoint of the collaboration tool based on the input type; and generating an API request object with the user input, the input type, and the metadata of the event, and providing, by the bridge service, the API request object as input to the second API endpoint of the collaboration tool service.

Certain embodiments described herein take the form of a method of operating a bridge service instance to automatically memorialize information generated when operating a third-party meeting service, the method including the operations of: accessing, by the bridge service, an application programming interface (API) endpoint of the third-party meeting service during an event defined by the third-party meeting service; obtaining event metadata from the third-party meeting service; monitoring, during the event, the API endpoint for user input; on receiving a user input, providing the user input as input to an input classifier to receive an input type; selecting a collaboration tool from a set of collaboration tools based on the input type; and providing, by the bridge service, the user input and the metadata as input to the selected collaboration tool.

Certain embodiments described herein take the form of a method of operating an instance of a bridge service configured to display task details in a third-party meeting service. The method can include accessing, by the bridge service, a first application programming interface (API) endpoint of the third-party meeting service during an event defined by the third-party meeting service to obtain event metadata from the third-party meeting service. The method can also include accessing, by the bridge service, a second API endpoint of a task management service during the event to obtain, using the event metadata from the first API, task information for tasks associated with the event and stored at the task management service. The method further includes analyzing the task information to determine a status of the tasks, generating, using the status of the tasks, one or more graphical summaries of the tasks associated with the event, and in response to generating the one or more graphical summaries, causing the one or more graphical summaries to be displayed by the third-party meeting service during the event.

Embodiments are also directed to methods of operating a bridge service to update task details at a task management program based in input received at a third-party meeting service. The methods can include accessing, by the bridge service, an application programming interface (API) endpoint of a task management service during an event defined by the third-party meeting service to obtain task information associated with the event from the task management service. Methods can also include causing the task information to be displayed by the third-party meeting service during the event in response to obtaining the task information and monitoring, during the event, an API endpoint of the third-party meeting service, for user input related to the task information. In response to receiving the user input the methods can include analyzing the user input to identify a request to create a new task in the task management service and in response to receiving the request to create the new task, sending a task creation request to the task management service, where the task creation request including the user input and an event identification generated by the third-party meeting service for the event.

Embodiments are further directed to a server system that includes a memory allocation defined by a data store storing an executable asset, a working memory allocation, and a processor allocation configured to load the executable asset from the data store into the working memory to instantiate an instance of a bridge service. The processor can communicably couple to an application programming interface (API) endpoint of a third-party videoconferencing platform, communicably couple to a task management service, and obtain event metadata from the third-party videoconferencing platform for an event being hosted by the third-party videoconferencing platform. In some cases, the processor can use the event metadata from the third-party videoconferencing platform to obtain task information for tasks associated with the event and stored at the task management service. The processor can analyze the task information to determine a status of the tasks, generate, using the status of the tasks, one or more graphical summaries of the tasks associated with the event, and in response to generating the one or more graphical summaries, cause the one or more graphical summaries to be displayed by the third-party videoconferencing platform during the event.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
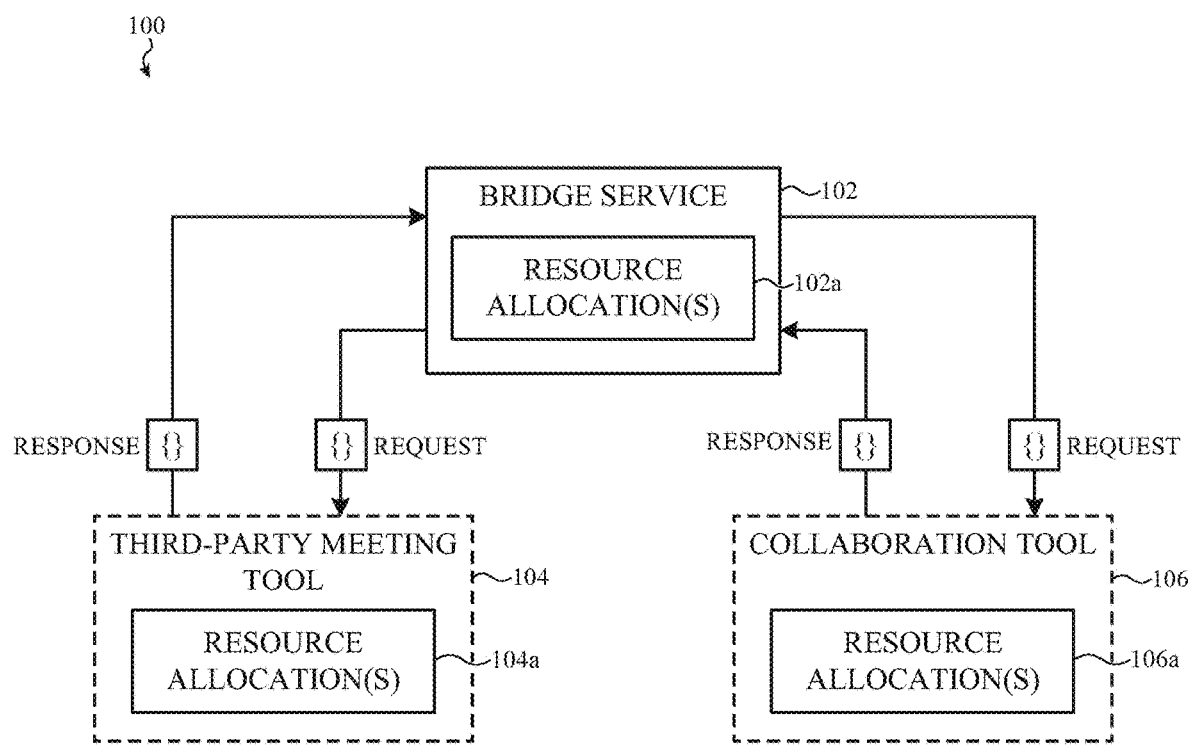
FIG. 1 depicts a collaborative work environment including a third-party meeting tool and a collaboration tool communicably coupled by an instance of a bridge service, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for automatically capturing team-generated content produced, referenced, generated, discussed and so on during a remote meeting. Embodiments described herein also relate to systems and methods for retrieving and displaying information related to tasks managed by one or more collaboration tools such as a task management service.

As used herein, the term "remote meeting" and similar terms including events, occasions, incidents and the like (collectively, "meetings") refer to meetings for which participation of at least one attendee is facilitated, at least in part by communications hardware or software.

More generally, a remote meeting is meeting for which at least one participant is not physically present with other participants, and software or hardware is leveraged by that participant to participate in the meeting. Examples of such software or hardware include but are not limited to: teleconferencing software and hardware; videoconferencing software and hardware; text or multimedia-based chat or discussion platforms; and so on. Collectively, such hardware and/or software tools that may be leveraged to facilitate, at least in part, a remote meeting are referred to herein as "third-party meeting tools" or "third-party meeting services."

For simplicity of description, the embodiments that follow reference a videoconferencing platform as an example third-party meeting tool. However, this is merely one example and may not be required of all implementations of all architectures described herein. Further, although many embodiments that follow reference a third-party meeting tool, it may be appreciated that the systems and methods described herein can equivalently apply to first-party meeting tools as well.

As used herein, the phrase "team-generated content" may be used to refer to any and all content, data, metadata, or other information regardless of form or format that is authored, developed, created, or otherwise added by, edited by, (or otherwise provided for the benefit of), an attendee during a remote meeting. Typically, although not required, team-generated content is input to a collaboration environment defined at least in part by a third-party meeting tool. For example, chat messages added to a chat window of a videoconferencing platform constitute team-generated content as described herein. Similarly, images of a shared screen presented during a video conference facilitated by a videoconferencing platform constitute team-generated content as described herein. More generally, team-generated content can include text information, multimedia information, links to external resources (following a format such as the uniform resource location "URL" format), or any other suitable information or data. For example, in further embodiments, team-generated content can include content spoken (and later, or in real-time, transcribed) during a remote meeting by a participant, content streamed by a participant (e.g., via screen sharing) in the remote meeting, chat logs, and so on.

In some cases, team-generated content that relates to a meeting can include content generated before or after a meeting. For example, a meeting invite circulated to members of a team in advance of a meeting can include information about the meeting, document attachments, links, and so on. Such content is team-generated content as described herein. Further, in some cases, content generated after a meeting, such as in a debriefing meeting or other follow-up meeting can be team-generated content relating to the earlier, original meeting.

In still further examples, team-generated content can include metadata relating to a meeting such as, but not limited to: names of attendees; times at which attendees joined and/or left a meeting; the manner by which an attendee joined a meeting (e.g., video, telephone, and so on); the percentage of time an attendee was on video and/or was muted; the percentage of total participation (e.g., by time, by word count, and so on) attributable to a particular attendee; whether an attendee led a meeting; whether or which attendees shared screens, or documents; sentiment (as determined by sentiment analysis) of an attendee of the meeting; tone and/or inferred emotional state (e.g., frustrated, happy, experiencing stress, and so on) of an attendee of the meeting; and so on.

As may be appreciated, these foregoing examples are not exhaustive; generally and broadly it is appreciated that team-generated content (including metadata describing the same) as described herein can refer to any content, subject, data, or statement regardless of form or format and regardless of source. Any content or metadata related to a meeting constitutes "team-generated content" as described herein.

As noted above, embodiments described herein relate to systems and methods for automatically capturing team-generated content produced, referenced, generated, discussed and so on, during a remote meeting, thereby relieving attendees of the meeting of the task of capturing notes. In other words, as a result of the architectures described herein, all attendees of a remote meeting can fully participate without distracted attention, such as the attention otherwise dedicated to manually capturing meeting nodes, collecting documents and links referenced in the meeting, and/or otherwise memorializing the meeting in one way or another.

More specifically, embodiments described herein relate to systems and methods for aggregating, in real time, team-generated content relating to a meeting conducted over a third-party meeting service and inputting that information, automatically, into one or more collaboration tools of a collaborative work environment.

For example, some embodiments instantiate a bridge service configured to communicably couple an API endpoint of a third-party meeting tool in order to extract therefrom structured data and metadata relating to a particular meeting. Once extracted, the team-generated content can be used to inform a selection of, by the bridge service, a collaboration tool into which the team-generated content should be provided as input.

Example team-generated data that can be obtained by a bridge service as described herein includes but is not limited to: meeting title; invitee list; attendee list; attendee titles; title of meeting invite; date and time of meeting invite; chat logs during the meeting; presenter logs during the meeting; interaction logs (e.g., hand raise, applause, and so on) during the meeting; screenshots taken during a presentation; times attendees signed in or out; transcript of a meeting; video recording of a meeting; and so on.

As noted above, generally and broadly, a bridge service as described herein can be configured to aggregate or otherwise obtain any data, content, or contextualizing information about a meeting and/or the proceedings thereof. In many cases, the bridge service may be configured to present data extracted from a meeting (and/or other team-generated content) in a summary document format that can later be used by attendees of the meeting to refresh a recollection of the meeting and its proceedings.

For example, a summary document generated by a bridge service as described herein can memorialize a meeting title, a meeting location (e.g., identifying a conference room, a particular third-party vendor, and so on), invitees, attendees, and one or more projects or subjects of a meeting. A subject of a meeting can be obtained, in some examples, from a title of a meeting invite circulated to meeting invitees. In other cases, an organizer of the meeting can select one or more topics or subjects of the meeting from a list of possible subjects, topics, or projects for discussion at the meeting.

In yet other examples, the bridge service can be configured to perform a semantic analysis of a transcript of the meeting to ascertain a subject of the meeting. Such constructions may be particularly helpful in a circumstance in which a meeting invite's subject differs from subject matter actually discussed at a particular meeting.

In yet other examples, the bridge service can be configured to determine which portions of a meeting transcript contain the most important or relevant information. For example, in one embodiment, the bridge service is configured to analyze a meeting transcript and to determine word frequency of each word and/or phrase in the document. Thereafter, by utilizing an algorithm such as term frequency, inverse document frequency (TF-IDF), the bridge service may be able to infer which timestamps of a meeting transcript or video call contain the most relevant information. A listing of relevant timestamps can be included in a summary document generated as described above.

In yet further examples, the bridge service can be configured to analyze a transcript, a chat log, or any other text input (e.g., documents linked, documents attached to a meeting invite, and so on) to determine a subject of a meeting. Such information can be included in a summary document generated as described above.

In yet other examples, the bridge service can be configured to monitor a transcript (whether live or otherwise) for keywords and/or instructional phrases. For example, the bridge service can be configured to, in real time, lemmatize, tokenize, and/or otherwise semantically normalize words spoken in a meeting such that instructions, decisions, or other important moments in the meeting can be captured in the summary document generated as described above. For example, in one construction, the bridge service can be configured to "listen" for trigger phrases of affirmation such as "I'll do that" or "that's on me." In response to identifying that a trigger phase has been spoken, the bridge service can note the time stamp of the trigger phrase (in some examples modified by a context buffer, such as 15 or 30 seconds in advance of the trigger phrase), identify the speaking user (e.g., based on active audio streams), in a summary document that "user 1 affirmed responsibility for X at 0:00."

These foregoing examples are not exhaustive. It may be appreciated, more generally and broadly, that a bridge service as described herein can be configured to aggregate or otherwise obtain any team-generated data associated with a particular meeting and generate a summary document from that aggregated date. In many embodiments, the summary document can be automatically added to a collaborative note taking application or service or a collaborative documentation service or any other suitable collaboration tool such as described herein.

In further examples the bridge service can include and/or can be communicably coupled to one or more classification engines, parsers, or analyzers. Each (along with equivalents thereof) can be configured to receive as input a team-generated content item and to provide as output one or more data items derived from that team-generated content item. For example, a classifier may be configured to label or otherwise classify a team-generated content item as a particular type (e.g., input type) selected from a set of input types. For example, a classifier as described herein may be configured to label a chat message of "sorry for joining late" as an ignorable team-generated content item.

Output of one or more classification engines, parser, or analyzers can further be included in a summary document, such as described above. For example, a bridge service can be coupled to a sentiment analyzer which may be configured to determine a sentiment of each speaker attending a meeting. In this example, a sentiment summary can be included by a bridge service in a summary document, such as described above. For example, the summary document may indicate that "Attendee 1 had a neutral sentiment during meeting 123" or "Attendee 3 expressed a negative sentiment at time 1:23 when discussing feature 456 of project A."

These foregoing examples are not exhaustive. It may be appreciated that a bridge service can obtain, analyze, and summarize team-generated content in any number of suitable ways by accessing any number of suitable API endpoints of a third-party meeting service, such as described herein.

For example, in some cases, a third-party meeting tool can implement a chat feature. In these examples, the bridge service can be configured to subscribe to user input events published by (or otherwise made available by) the third-party meeting tool via a particular API endpoint. The bridge service consumes each received user input event (e.g., each new chat message input by an attendee of a meeting into a chat window rendered to support the chat feature) to determine whether a user input (e.g., text content, multimedia content, links, and so on) associated with the user input event contains information that should be captured or contains information that should be ignored. More generally, the bridge service is configured to parse the user input event to extract information or data, which can include team-generated content, therefrom.

As noted above, data parsed/extracted from a user input event can inform other operations of the bridge service. For example, in some embodiments the bridge service may be configured to execute a regular expression configured, in turn, to detect the presence of a particular keyword in a string of text. In response to detecting that keyword, the bridge service can perform an action, such as selecting a particular collaboration tool (and/or a particular API endpoint of that tool) into which team-generated data should be added.

In addition, embodiments described herein relate to systems and methods for extending familiar user interaction schema(s) of a collaboration tool to a third-party meeting tool, such as a video conferencing platform. As a result of these architectures, users of the collaboration tool can interact directly with features of the third-party meeting tool in the same manner that those users would otherwise interact with the collaboration tool directly. In another phrasing, a user can interact with one or more features of the third-party meeting tool and, in response, one or more actions can be automatically performed by the bridge service, within, or to, a selected collaboration tool.

In one example, a team of software developers may leverage an issue tracking system to record and follow process of one or more projects. This team may become familiar with one or more shortcuts or other interaction schemas (e.g., keyword triggers, script triggers, and so on) provided by that issue tracking system. For example, the issue tracking system may be configured to automatically create a new issue record after detecting a particularly-formatted user input, such as user input including a particular keyword, hashtag, or token or symbol-delimited phrase. As one example, the user may input to a text input field of the issue tracking system the text string "/task @user need to update project documents." In this example, the issue tracking system can be configured to detect the slash-prefixed term "task" (e.g., via regular expression), the at-sign prefixed term "user" and the remaining text "need to update project document." With this information, the issue tracking system can create a new task, assigned to the identified user, with the title "Need to Update Project Documents."

In addition, the same team of software developers may leverage a collaborative documentation system to maintain documentation and share information. As with the issue tracking system referenced above, the team may become familiar with one or more shortcuts or other interaction schemas (e.g., keyword triggers, script triggers, and so on) provided by that collaborative documentation system. For example, like the issue tracking system, the collaborative documentation system may be configured to perform a specific action after detecting a particularly-formatted user input, such as user input including a particular keyword, hashtag, or token or symbol-delimited phrase.

As one example, the user may input to a text input field of the collaborative documentation system the text string "/project/feature/new title: email authentication content: this product authenticates users based on single sign-on, tied to the user's corporate email address." In this example, the collaborative documentation system can be configured to detect the slash-prefixed path "/project/feature/new" (e.g., via regular expression), the colon suffixed terms "title" and "content" and the remaining text delimited by the terms title and content. With this information, the collaborative documentation system can create a new page at the path, with the specified title and the specified content.

Following this same preceding example, for embodiments described herein, the bridge service can be configured to extend the interaction schemas described above from the issue tracking system and the collaborative documentation system to the third-party meeting tool. More particularly, the bridge service can be configured to obtain user input provided to a chat feature of the third-party meeting tool, and parse that user input to determine which collaboration tool the user intends to interact with, and thereafter provide the user's instruction to the appropriate tool.

For example, the foregoing referenced team of software developers may begin a meeting using a third-party videoconference tool. During the meeting, an attendee may recognize that a new issue should be created. In conventional systems, as noted above, attendees of the meeting are required to manually add information generated in the meeting into appropriate collaboration tools, a task which is often cumbersome (e.g., requiring context switching between the collaboration tool and the third-party tool) and/or attention-consuming for at least one meeting attendee.

For embodiments describe herein, however, the attendee that recognizes that a new issue should be created can simply input an instruction string into the chat feature of the videoconference, formatted in the same manner as would otherwise be input directly to the issue tracking system. For example, the attendee may chat into the third-party meeting tool's chat window the string: "/task @me isolate cause of PNG display bug." This string can be received as a user input event by a bridge service, as described herein.

The bridge service can parse the string (and/or user input event) and/or compare the string's format against a set of interaction schemas each associated with a particular collaboration tool. Once a match is found between the string and a particular interaction schema, the bridge service can select the associated collaboration tool and forward the attendee's command to that selected tool to perform the task intended by the attendee.

With reference to the preceding example, the bridge service may detect an "add task" flag associated with an issue tracking system based on the presence of the string "/task." In other words, presence of this flag indicates to the bridge service that the interaction schema referenced by the user belongs to or is associated with an issue tracking system. The new task can be assigned to the user who added the comment to the chat, based on the presence of the self-referential handle "@me." As with other examples provided here, the new task can be created with the title "Isolate Cause of PNG Display Bug."

In some examples, an interaction schema is validated by (and/or defined by) comparing a string input by a user (and/or extracted from team-generated content) against a regular expression. For example, an issue tracking system can be associated with a first set of regular expressions/interaction schemas, whereas a collaborative documentation system can be associated with a second set of regular expressions/interaction schemas. In many embodiments, the first set and the second set are disjoint. As a result of these constructions, the bridge service can compare user input against each interaction schema of the set(s) of interaction schemas to find a match. Once a match is found, the user input can be forwarded to the associated collaboration tool. In this manner, the third-party meeting tool's chat window's functionality is extended to support familiar user interaction schemas of multiple collaboration tools.

For example, in one embodiment, an interaction schema associated with a particular collaboration tool can be defined in a data structure. As one example, an interaction schema associated with adding a new issue record to an issue tracking system can be defined as follows:

```
{
   "action" : "new_issue",
   "expression" : "(?i)(/action)\s+(@[a-z0-9_]{1,})\s+(.*?)$"
}
```

In this example, a first capture group is defined as beginning with a forward slash and the term "action." A second capture group follows the first capture group (by at least one whitespace character) and is defined as beginning with an at-sign followed by a word containing only alphanumeric characters and underscore characters. The third capture group follows the second capture group, and can contain any character until a newline character is detected. If a user input matches this regular expression, the bridge service can infer that the user input contains a "create new issue" command intended for the issue tracking system.

More specifically, the bridge service can infer that the attendee intends to create a new issue in the issue tracking system with a title or description based on the content of the third capture group, and, additionally, that the new issue should be assigned to the responsibility of a user identified by the handle defined by the second capture group. Based on this determination, the bridge service may either (1) select and provide input to a "create issue" API endpoint of the issue tracking system dedicated to creating new issues or (2) can provide the user input directly as user input to a text input field or text input API endpoint of the issue tracking system. In this manner, and as a result of this construction, the bridge service automatically (1) recognizes that free-form user input provided by a user to a third-party tool is intended as an instruction for a particular/specific collaboration system, and (2) automatically forwards that information (and/or generates an API request based on that information) to the identified collaboration tool, in this case, an issue tracking system.

As another example, an interaction schema associated with editing an existing issue record in an issue tracking system can be defined as follows:

```
{
  "action" : "edit_issue",
  "expression" : "(?i)/([0-9a-z]{1,)(/edit)\s+(@[a-z0-9_]{1,})\s+(.*?)$"
}
```

In this example, similar to the preceding example, a first capture group is defined as beginning with a forward slash and containing only alphanumeric characters. A second capture group follows the first and is preceded by a forward slash and the term "edit." A third capture group follows the second capture group by at least one whitespace character and is defined as beginning with an at-sign followed by a word containing only alphanumeric characters and underscore characters. A fourth capture group follows the third capture group, and can contain any character until a newline character is detected. If a user input matches this regular expression, the bridge service can infer that the user input contains an "edit existing issue" command intended for the issue tracking system.

The issue to edit can be defined by or based on the content of the first capture group. As with the preceding example, the bridge service can infer that the attendee intends to edit an issue in the issue tracking system identified by the content of the first capture group, with a title or description based on the content of the fourth capture group, and, additionally, that the edited issue should be assigned to the responsibility of a user identified by the handle defined by the third capture group. Based on this determination, as with the preceding example, the bridge service may either (1) select and provide input to an "edit issue" API endpoint of the issue tracking system dedicated to editing existing issues or (2) can provide the user input directly as user input to a text input field or text input API endpoint of the issue tracking system. In this manner, and as a result of this construction, the bridge service automatically (1) recognizes that free-form user input provided by a user to a third-party tool is intended as an instruction for a particular/specific collaboration system, and (2) automatically forwards that information (and/or generates an API request based on that information) to the identified collaboration tool, in this case, again, an issue tracking system.

As noted above, however, different collaboration systems may (and do) implement different interaction schemas. For example, an interaction schema associated with adding a page in a collaborative documentation system can be defined as follows:

```
{
  "action" : "add_page",
  "expression" : "(?i)(/[a-z0-9_]{1,})(/new)\s+(@[a-z0-9_]{1,})\s+(.*?)$"
}
```

In this example, similar to the preceding example, a first capture group is defined as beginning with a forward slash and containing only alphanumeric or additional forward slash characters. A second capture group follows the first and is preceded by a forward slash and the term "new." A third capture group follows the second capture group by at least one whitespace character and is defined as beginning with an at-sign followed by a word containing only alphanumeric characters and underscore characters. A fourth capture group follows the third capture group, and can contain any character until a newline character is detected. If a user input matches this regular expression, the bridge service can infer that the user input contains an "new page" command intended for the collaborative documentation system. The new page can be located at the path defined by the first capture group.

As with the preceding example, the bridge service can infer that the attendee intends to add a page in the collaborative documentation system, with a title or description based on the content of the fourth capture group, and, additionally, that the new page should list a user identified by the handle defined by the third capture group as the creator of that page. Based on this determination, as with the preceding example, the bridge service may either (1) select and provide input to a "new page" API endpoint of the collaborative documentation system or (2) can provide the user input directly as user input to a text input field or text input API endpoint of the collaborative documentation system. In this manner, and as a result of this construction, the bridge service automatically (1) recognizes that free-form user input provided by a user to a third-party tool is intended as an instruction for a particular/specific collaboration system, and (2) automatically forwards that information (and/or generates an API request based on that information) to the identified collaboration tool, in this case, a collaborative documentation system.

These foregoing examples are not exhaustive. It may be appreciated, more generally and broadly, that bridge service as described herein can be configured to leverage application programming interfaces ("APIs") of third-party meeting tools and collaboration tools of a collaborative work environment to extend user interaction schemas of one or more collaboration tools to those third-party tools.

As a result, users of the third-party tool can interact with that third-party tool in the same manner as collaboration tools used by the team, thereby dramatically simplifying the process of adding information generated in a meeting to one or more collaboration tools. Simultaneously with extending interaction schemas of various collaboration tools for the benefit of meeting attendees, the bridge service is configured to, as noted above, collect team-generated content and meeting metadata in order to generate a summary document which, at the conclusion of a meeting can be automatically added to a collaborative documentation system.

In yet further embodiments, a bridge service as described herein can be configured to extract information from one or more collaboration tools and transmit that information back to a third-party meeting system, such as described above. For example, in one embodiment, a participant in a meeting may enter a command into a chat window of a videoconference directed to (and formatted according to) a particular collaboration tool. The bridge service, as noted above, can recognize this command and direct the command (and/or an object created in response to receiving the comment) to an appropriate target collaboration tool. In this example, however, the collaboration tool may provide a response that the bridge service, in turn, is configured to receive. In some cases, the bridge service may thereafter access an API endpoint of the meeting service to input the response from the collaboration tool into a portion of the third-party meeting tool.

For example, in one embodiment of the preceding example, a meeting participant enters into a chat (during a video conference), "/issue_tracking_system #ProgressReport EmailSystem." The bridge service can recognize the syntax (e.g., an interaction schema) used by the user as a command intended to be consumed by an issue tracking system. Thereafter, the bridge service forwards the user input to an issue tracking system. In response, the issue tracking system returns to the bridge service a progress report (e.g., a percentage of work complete) corresponding to a project named EmailSystem. Once the bridge service receives this response from the collaboration tool, the bridge service can add the status report into the chat of the third-party video service.

In yet further embodiments, a bridge service as described herein can be configured to retrieve information from a third-party meeting service, use that information to extract task and/or issue data from one or more collaboration tools and process the extracted information to generate graphical summaries that are displayed by the third-party meeting service. For example, in one embodiment, a participant in a meeting may request to view a summary of tasks and/or issues that have been discussed, created, updated or are otherwise associated with a current meeting. In response, the bridge service can use the meeting identification to retrieve task and/or issue data associated with the meeting identification from a collaboration tool such as a task management system. In some cases, the bridge service can analyze the information and generate graphical summaries for the task information. For example, the graphical summaries can include a number of tasks associated with a particular meeting, a status of the tasks such as how many are complete, how many are in progress and how many are waiting to be started. The graphical summaries can include information about particular tasks such as a titles, dates the tasks were created, dates the tasks were finished, and so on. In some cases, the task information can be analyzed to determine if the tasks are progressing on schedule, how task completion is contributing to larger projects such as a project that the meeting is created for and so on. The bridge service can cause the third-party meeting system to display the graphical summaries during a meeting. For example, the third-party meeting service can display graphical summaries on the screens of one or more user's client devices. Accordingly, users of the meeting may be able to efficiently review, track and/or edit tasks.

In some embodiments, the bridge service can be configured to track issue data across a series of meetings and generate graphical summaries based on changes to the issue data. For example, as the status of specific issues are updated, the bridge service can track changes to the status between a first meeting and a second meeting. In some cases, the bridge service can provide graphical summaries to provide information on changes to specific issues. In some cases, this can include graphical summaries that indicate an issue has changed from a pending status to an active status, and/or that one or more issues have been completed since the last meeting. In some cases, the bridge service can be configured to flag issues that have remained in the same state for a specific period of time, which may be useful to flagging issues that are stuck in a certain state or not progressing as desired. The bridge service can also track issues across different meetings according to one or more parameters such as a specific user, team, project, and so on. The bridge service can be configured to generate API calls and/or aggregate data based on participant IDs, specific project IDs, and/or the like. For example, if not all of the invitees are present at a particular meeting, the bridge service can pull issue data and generate summaries for the invitees that are signed into the meeting. In this regard, the bridge service can customize the analysis and graphical summaries based on one or more meeting parameters such as the current attendees.

In this manner, it may be appreciated that generally and broadly, a bridge service as described herein can be leveraged in two directions—a first direction to collect information generated during a meeting facilitated by a third-party system and in a second direction to provide information to participants of an ongoing meeting.

These foregoing and other embodiments are discussed below with reference to FIGS. 1-9 However, those skilled in the art will readily appreciate that the detailed description given herein with respect to these figures is for explanation only and should not be construed as limiting.

Figure 2A:
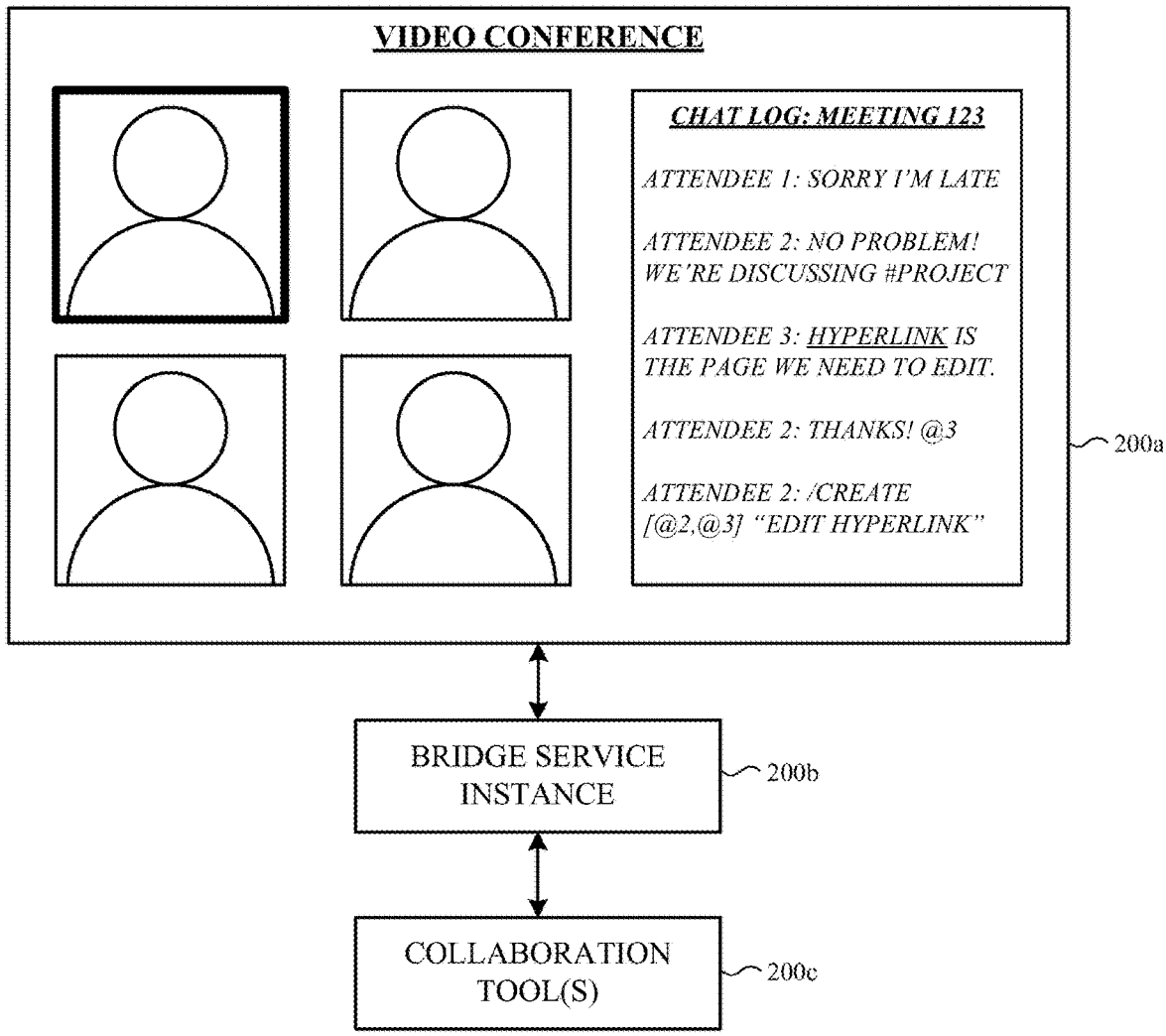
FIGS. 2A-2B depict a collaborative work environment, such as the collaborative work environment of FIG. 1, including a third-party meeting tool and one or more collaboration tools communicably coupled by an instance of a bridge service configured to communicably couple to API endpoints of both the third-party meeting tool and one or more collaboration tools, such as described herein.
Figure 2B:
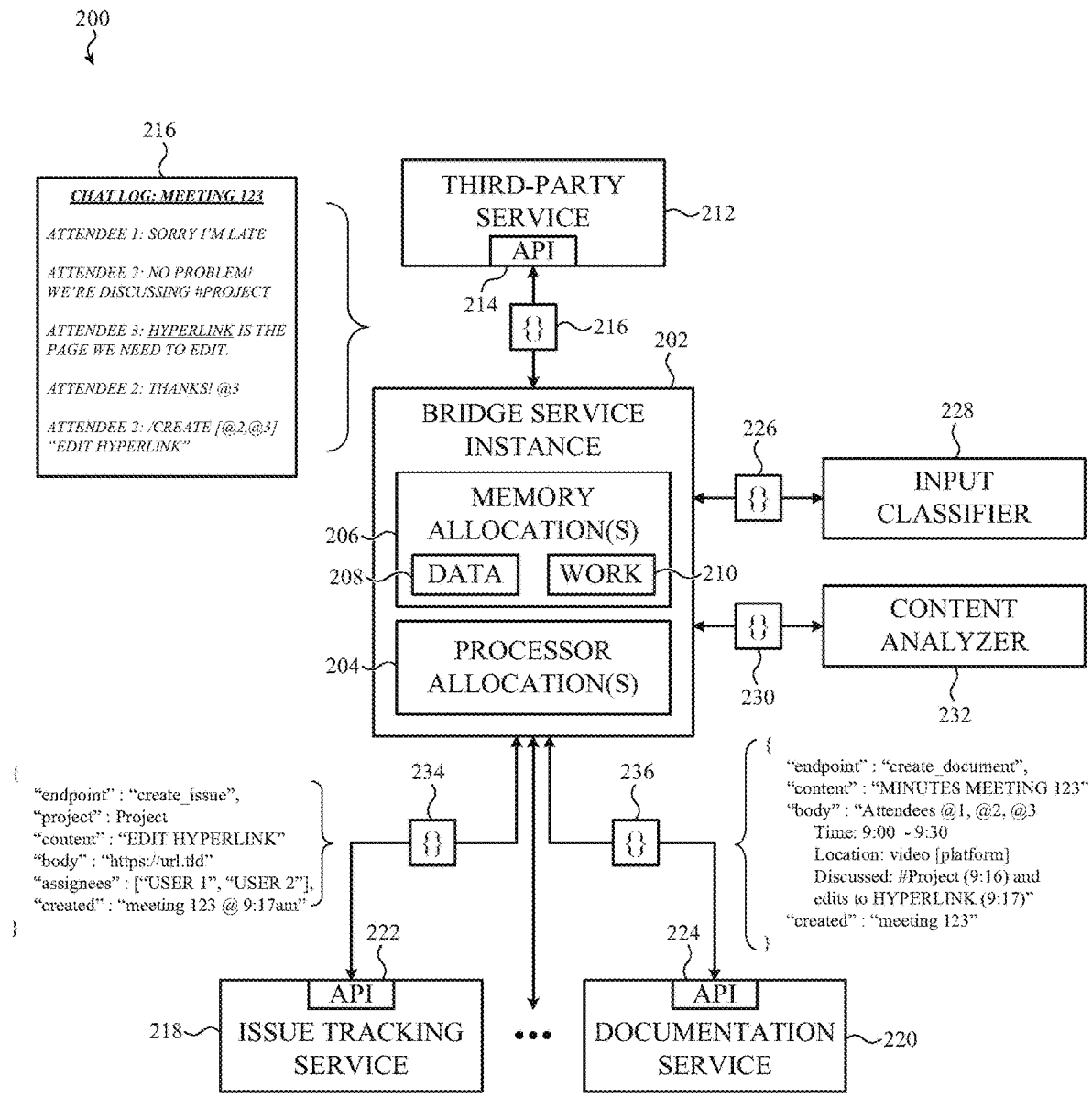

Generally and broadly, FIGS. 1 and 2A-2B depict simplified system diagrams of a collaborative work environment that may include one or more collaboration tools or collaboration services.

One example of a collaboration tool/software service, as described herein, is a project management system or tool that can be implemented in whole or in part as an instance or tenant of an instance of software executed by a container, a virtual server, or a physical server (or other computing appliance or combination of appliances) that provides a team of individuals with a means for communicating and exchanging information with one another. All information exchanged through and/or added to a project management system or tool can be considered team-generated content, as described herein.

In some examples, a collaboration tool can be configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). Each data item associated with each above-described function can be considered team-generated content, as described herein.

In other cases, a collaboration tool can be configured for non-software related purposes, such as for use by a human resources team, an information technology support group, and so on. As with other examples introduced above, any configuration or addition of information to any collaboration tool described herein can be considered team-generated content, as described herein.

To perform these functions, a collaboration tool, however configured or used by a team of individuals or an organization, can implement a client-server architecture in which a host server or service associated with the collaboration tool receives requests from and provides responses to (some or all of which may comply with a communication protocol such as HTTP, TCP, UDP, and the like) one or more client devices, each of which may be operated by a user of the collaboration tool. In other cases, a request-response architecture may not be required and other communication and information transaction techniques may be used. For simplicity of description, examples that follow reference a request-response architecture, but it may be appreciated that different collaboration tools may be configured to serve and/or host information, including team-generated content, in a number of suitable ways.

In these examples, more specifically, a host server or server system supporting one or more functions of a collaboration tool such as described herein can serve information, including team-generated content, to a client device and, in response, the client device can render a graphical user interface on a display to present at least a portion of that team-generated content to a user of that client device. More specifically, a server system that includes a memory allocation and a processor allocation can instantiate an instance of a collaboration tool, as described herein. Once instantiated, the collaboration tool can be configured to receive API requests from a client device, from other collaboration tools, or from a bridge service as described herein.

More specifically, FIG. 1 depicts a collaborative work environment 100 that includes a bridge service 102, a third-party meeting tool 104, and a collaboration tool 106. Each of the bridge service 102, the third-party meeting tool 104, and the collaboration tool 106 can be configured to operate as an instance of software independently instantiated over a server system. In some cases, one or more of the bridge service 102, the third-party meeting tool 104, and the collaboration tool 106 may be instantiated over the same physical resources (e.g., memory, processor, and so on), whereas in other cases, each of the bridge service 102, the third-party meeting tool 104, and the collaboration tool 106 are instantiated over different, independent, and distinct physical hardware.

As the manner by which the bridge service 102, the third-party meeting tool 104, and the collaboration tool 106 are instantiated varies from embodiment to embodiment, FIG. 1 depicts each of the bridge service 102, the third-party meeting tool 104, and the collaboration tool 106 as supported by dedicated resource allocations. In particular, the bridge service 102 is supported by the resource allocation 102a, the third-party meeting tool 104 is supported by the resource allocation 104a, and the collaboration tool 106 is supported by the resource allocation 106a.

As with other embodiments described herein, the resource allocations supporting the bridge service 102, the third-party meeting tool 104, and the collaboration tool 106 can each include a processor allocation and a memory allocation. The processor and memory allocations may be static and/or may be scalable and dynamically resizable.

In many embodiments, the memory allocations of the bridge service 102, the third-party meeting tool 104, and the collaboration tool 106 include at least a data store or other data base and a working memory allocation.

As a result of these constructions, each of the bridge service 102, the third-party meeting tool 104, and the collaboration tool 106 can be instantiated in response to a respective processor allocation accessing from a respective data store at least one executable asset (e.g., compiled binary, executable code, other computer instructions, and so on). Thereafter, the processor allocation can load at least a portion of the executable asset into the respective working memory allocation in order to instantiate respective instances of the bridge service 102, the third-party meeting tool 104, and the collaboration tool 106.

Once each of the bridge service 102, the third-party meeting tool 104, and the collaboration tool 106 are instantiated, the bridge service 102 can be configured to communicably couple to the third-party meeting tool 104 and the collaboration tool 106.

More specifically as noted above, in many cases the bridge service 102 is configured to communicate with the third-party meeting tool 104 and the collaboration tool 106 according to a request/response architecture. This, however is not a required implementation. In other embodiments, a subscription/publication communication model may be implemented.

FIGS. 2A-2B depict a collaborative work environment, such as the collaborative work environment of FIG. 1, including a third-party meeting tool and one or more collaboration tools communicably coupled by an instance of a bridge service configured to communicably couple to API endpoints of both the third-party meeting tool and one or more collaboration tools, such as described herein.

FIG. 2A depicts the collaborative work environment 200 that includes, as one example, a third-party video conferencing platform 200a that is communicably coupled to a bridge service 200b which, in turn, is communicably coupled to one or more collaboration tools 200c. In some cases, the bridge service 200b is a plugin to the third-party video conferencing platform 200a (and executes over the same hardware thereof), whereas in other cases, the bridge service 200b executes over different and separate hardware. This general architecture facilitates various embodiments described herein in which team-generated content (including chat content, transcript content, file sharing, and others) produced or otherwise generated during a video conference facilitated by the third-party video conferencing platform 200a can be captured and aggregated by the bridge service 200b and, in turn, stored into one or more selected collaboration tools among the one or more collaboration tools 200c. In addition, as noted above, the bridge service 200b can obtain information from one or more collaboration tools 200c to input to a video conference, such as via a chat window of the third-party video conferencing platform 200a, as a video participant (e.g., by sharing a screen, providing text in a video stream, via audio in a video stream), and so on.

FIG. 2B depicts the collaborative work environment 200 in greater detail and includes a bridge service instance 202. As noted above, the bridge service instance 202 can be supported by an allocation of processing and memory resources. For example, the bridge service instance 202 can be executed over a processor allocation 204 and a memory allocation 206 that includes a data store 208 and a working memory 210. As with other example embodiments described herein, in order to instantiate the bridge service instance 202, the processor allocation 204 may be configured to access the data store 208 in order to load therefrom at least a portion of an executable asset into the working memory 210.

The bridge service instance 202, once instantiated, is configured to communicate with a third-party meeting service 212 via at least one API endpoint, identified in the figure as the API endpoint 214. As a result of this construction, the bridge service instance 202 can exchange structured data 216 (e.g., in the form of requests/responses) with the third-party messaging service 212.

The structured data 216 returned form the third-party meeting service 212 can include any suitable information about an ongoing meeting or a past meeting at least in part facilitated by the third-party meeting service 212. For example, in some embodiments, the structured data 216 can include a chat log (such as shown in FIG. 2). In other cases the structured data 216 can include other information generated by or stored by the third-party meeting service 212. Example information includes but is not limited to: team-generated content; meeting ID; date and time of meeting; invitee list; attendee list; transcript; video recording link; audio recording link; document list of documents exchanged or shared; current speaker; current users on mute; and so on. It may be appreciated by a person of skill in the art that any suitable data supported or served by the API endpoint 214 can be encapsulated in the structured data 216.

As noted with respect to other embodiments described herein, the bridge service instance 202 is configured to aggregate data about a meeting and data created during a meeting (and/or before or after) in order to (1) generate a summary document memorializing and summarizing the meeting and (2) extend one or more user interaction schemas defined by one or more collaboration tools.

As such, the bridge service instance 202 may also be communicably coupled to one or more collaboration tools. For example, the bridge service instance 202 may be coupled to an issue tracking service 218 and a documentation service 220.

As with the communications between the bridge service instance 202 and the third-party meeting service 212, the bridge service instance 202 communicates with each of the issue tracking service 218 and the documentation service 220 via tool-specific APIs.

For example, the bridge service instance 202 can be configured to leverage an API endpoint 222 to communicate with the issue tracking service 218 and an API endpoint 224 to communicate with the documentation service 220.

As noted above, the bridge service instance 202 may leverage the API endpoints 214, 222, and 224 to transit information created, generated, referenced, or otherwise associated with a meeting facilitated by the third-party meeting service 212 into one or more of the issue tracking service 218 or the documentation service 220.

In order to determine which collaboration tool should be the recipient of information (such as team-generated content) obtained from the third-party meeting service 212, the bridge service instance 202 is configured to provide input(s) or other data received from the third-party meeting service 212 as an input 226 to an input classifier 228. The input classifier 228 can be implemented in a number of suitable ways, one such example of which is a trained classifier. The input classifier 228 is configured to receive as input at least one data item obtained by the bridge service instance 202 from the third-party meeting service 212 via the API endpoint 214.

In some cases, the input classifier 228 may be leveraged by the bridge service instance 202 to determine whether or not to ignore certain content obtained from the third-party meeting service 212 via the API endpoint 214. For example, during a meeting, a user may enter into a chat window of the third-party meeting service a greeting to other users, or may offer a comment such as "great!" or "my internet connection is poor." The input classifier 228 may be trained and/or otherwise configured to determine whether such input should be ignored. Phrased in another non-limiting manner, the input classifier 228 may label such input as "Chatter" or "Ignored Content."

In other cases, the input classifier 228 may be configured to apply other labels to input based on the content of that input. For example, if a team-generated content item includes a string that references a project tracked by a project management system, the input classifier 228 may classify that input as a candidate for input to the identified project management system. Similarly, if a team-generated content item received by the bridge service instance 202 from the third-party meeting service 212 via the API endpoint 214 includes a phrase such as "bug" or "issue report" or similar, the input classifier 228 may classify/label that input as a candidate for input to an issue tracking system.

These foregoing examples are not exhaustive; it may be appreciated that an input classifier such as the input classifier 228 can be configured in any suitable manner to tag, label, or otherwise organize or classify inputs(s) received by the bridge service instance 202 from the third-party meeting service 212 via the API endpoint 214.

Regardless of configuration or construction, it may be appreciated that generally and broadly, the bridge service instance 202 can provide a team-generate content item as input 226 to the input classifier 228 and, in turn, can receive as output from the input classifier 228 a label or classification which can inform an operation or decision of the bridge service instance 202. In one example, the bridge service instance 202 merely uses output form the input classifier 228 to determine which collaboration tool to select to store a particular data item. In other cases, the bridge service instance 202 leverages the label to perform other operations, such as validation operations, data extraction operations, metadata calculation or generation operations and so on. Broadly, the bridge service instance 202 can leverage output form the input classifier 228 in any suitable manner.

In addition, in some embodiments, the bridge service instance 202 is configured to provide input 230 (which can include an output of the input classifier 228 and/or one or more team-generated content items) to a content analyzer 232. The content analyzer 232 can be configured to perform one or more of the following, without limitation: sentiment analysis; image content analysis; transcription services; data validation; tone analysis; statistical analysis; regular expression matching; regular expression context extraction; and so on. In many cases, an output provided by the content analyzer 232 can be leveraged by the bridge service instance 202 to select a particular API endpoint of a particular collaboration tool, such as described above.

In further embodiments, the bridge service instance 202 can leverage an output of the content analyzer 232 to recognize user of an interaction schema by an attendee of the meeting. For example, as described above, the content analyzer 232 can be configured to compare team-generated content or other data or metadata obtained by the bridge service instance 202 to one or more interaction schemas (e.g., by regular expression comparison, as one example) that, in turn, are associated with a respective one collaboration tool.

In view of the foregoing described and illustrated architecture, it may be appreciated that a bridge service instance, such as the bridge service instance 202 can be configured in a number of suitable ways to (1) extend to third-party meeting tools user interaction schemas familiar to users of collaboration tools and (2) to automatically aggregate and summarize team-generated content created, referenced, displayed, or otherwise relevant to a meeting facilitated by that third-party meeting tool or service.

More specifically, the bridge service instance 202 can analyze content (e.g., chat messages, links, documents shared, content of screen sharing, conversation, video content and so on) generated during a meeting and can inform one or more decisions based on that analysis. For example, the bridge service instance 202 can determine that a first content item corresponds to a request to create a new issue (an issue record) tracked by the issue tracking system 218. For example, the bridge service instance 202 may have detected that an attendee of the meeting said, "we should open a ticket for this data integrity bug; John can handle it" or an attendee of the meeting may have entered into a chat window of the third-party meeting service 212, "/new @john study data integrity bug."

In the first case, the bridge service instance 202 may identify, based on an output of the input classifier 228, that the statement "we should open a ticket" comprises an "Intent." In addition, the bridge service instance 202 may leverage an output of the content analyzer 232 to extract the phrases "new ticket," "data integrity bug" and the name "John" from the statement. With these phrases, the bridge service instance 202 can determine that the speaker, Jane, has assigned a new task to John with the title "Data Integrity Bug." This determination can be used to select the issue tracking service 218, select an API endpoint, such as the API endpoint 222, of the issue tracking service 218 specific to creating issues, and generate a request object 234 to provide as input to the issue tracking service.

In the second case, the bridge service instance 202 may identify based on an output of the content analyzer 232 that the message is formatted in a manner that matches an interaction schema associated with the issue tracking service 218. In this example, the bridge service instance 202 can either (1) forward the message directly to a text input API endpoint of the issue tracking service 218 or, (2) can further parse the message in order to create and/or generate the request object 234.

In another example, the bridge service instance 202 may determine that a particular content item is intended to be memorialized in the documentation service 220, or another collaboration tool. In this example, as described above, the bridge service instance 202 can be configured to either (1) generate a request object 236 or (2) forward at least a portion of a received data item directly to the selected collaboration tool.

In view of the foregoing, it may be appreciated that a bridge service instance, such as the bridge service instance 202 can be configured in a number of ways to (1) automatically capture content exchanged and/or generated during a meeting and (2) facilitate easy access to one or more collaboration tools through the same user interface as used to conduct a meeting, namely, within an environment defined by a third-party meeting tool.

These foregoing embodiments depicted in FIGS. 1-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some embodiments, a bridge service instance may be configured to parse information from a meeting invite prior to the start of that meeting. In certain constructions a graphical user interface can be presented to a meeting organizer that allows the meeting organizer to specify for a bridge service (and attendees of the meeting) specific connections or logical associations with one or more collaboration tools.

Figure 3:
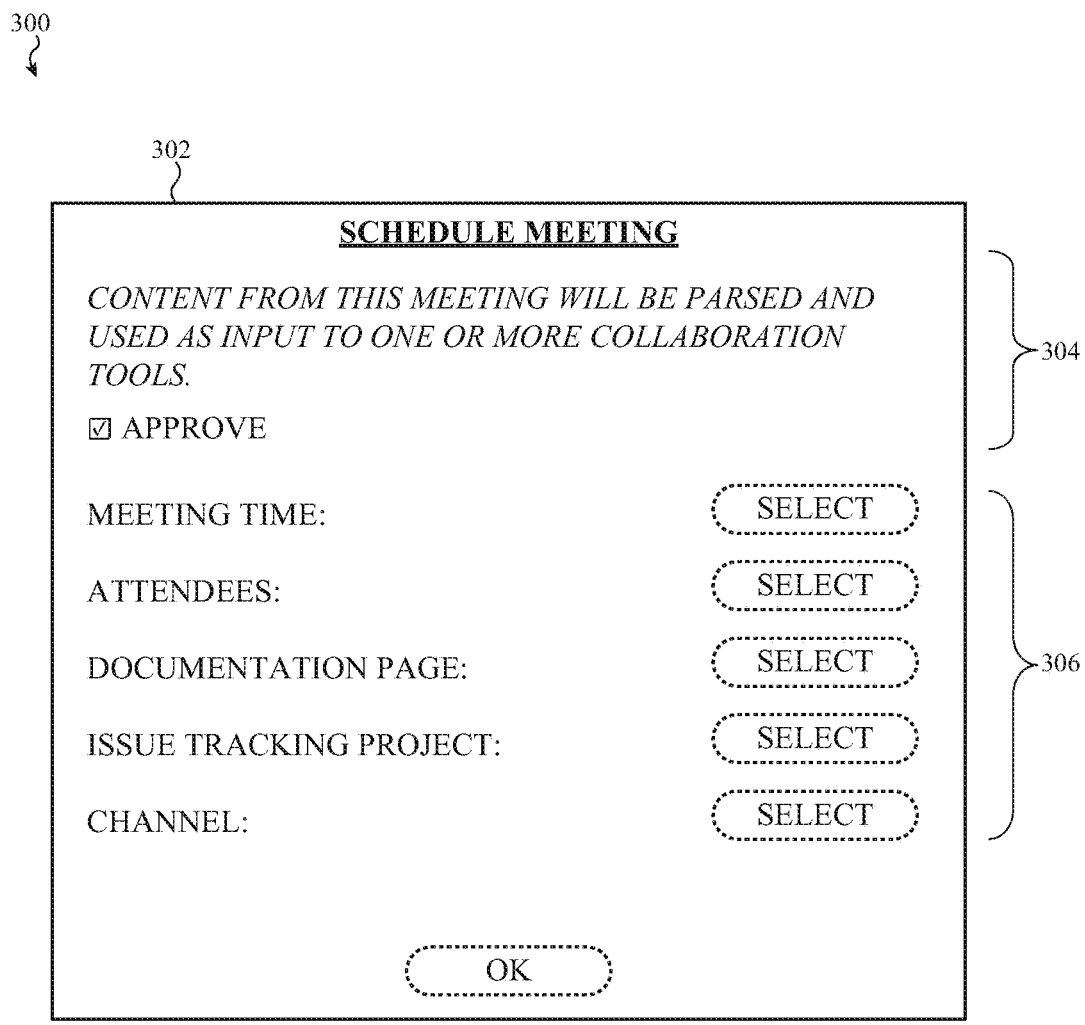
FIG. 3 depicts an active display area of a client device associated with a collaborative work environment, as described herein, rendering a graphical user interface defining one or more user interface elements that can be leveraged by a user to inform behavior of a bridge service, as described herein.

For example, FIG. 3 depicts an active display area 300 of a client device associated with a collaborative work environment, as described herein. The client device is depicted as rendering a graphical user interface 302 defining one or more user interface elements that can be leveraged by a user to inform behavior of a bridge service, as described herein.

In particular, the graphical user interface 302 depicts an interface that may be used by an organizer of a meeting to define a logical association between a meeting facilitated by a third-party meeting system and one or more collaboration tools, such as an issue tracking system and/or a documentation system.

For example, in the illustrated embodiment, the graphical user interface 302 includes a disclosure section 304 that informs the organizer and/or requests permission from the organizer to monitor team-generated content during a meeting in order to automatically generate meeting minutes (e.g., a document summary or summary document, such as described above). In this example, once the organizer affirms that the organizer agrees to operation of the bridge service as described herein, one or more additional options 306 may be presented for the organizer. These additional options enable the organizer to specify a logical association between a particular project (e.g., tracked by an issue tracking system) and/or a documentation page (e.g., maintained by a documentation system).

These options, as noted above, can be saved with a circulated meeting invite which, in turn, can be parsed and/or otherwise consumed by a bridge service as described herein.

It may be appreciated that the foregoing simplified example graphical user interface is merely one example means by which a system as described herein can incorporate more information into a meeting invitation to assist with functionality of a bridge service such as described herein.

For example, in some embodiments, different collaboration tools and/or components of collaboration tools (e.g., projects, pages, and so on) can be used.

Regardless of form or format of a graphical user interface presented to an organizer of a meeting, it may be appreciated that the data added to that invite is team-generated content, such as described herein and can therefore be consumed by a bridge service to (1) generate a summary document and/or (2) to extend one or more user interface interaction schemas associated with a collaboration tool to the third-party meeting tool.

Figure 4:
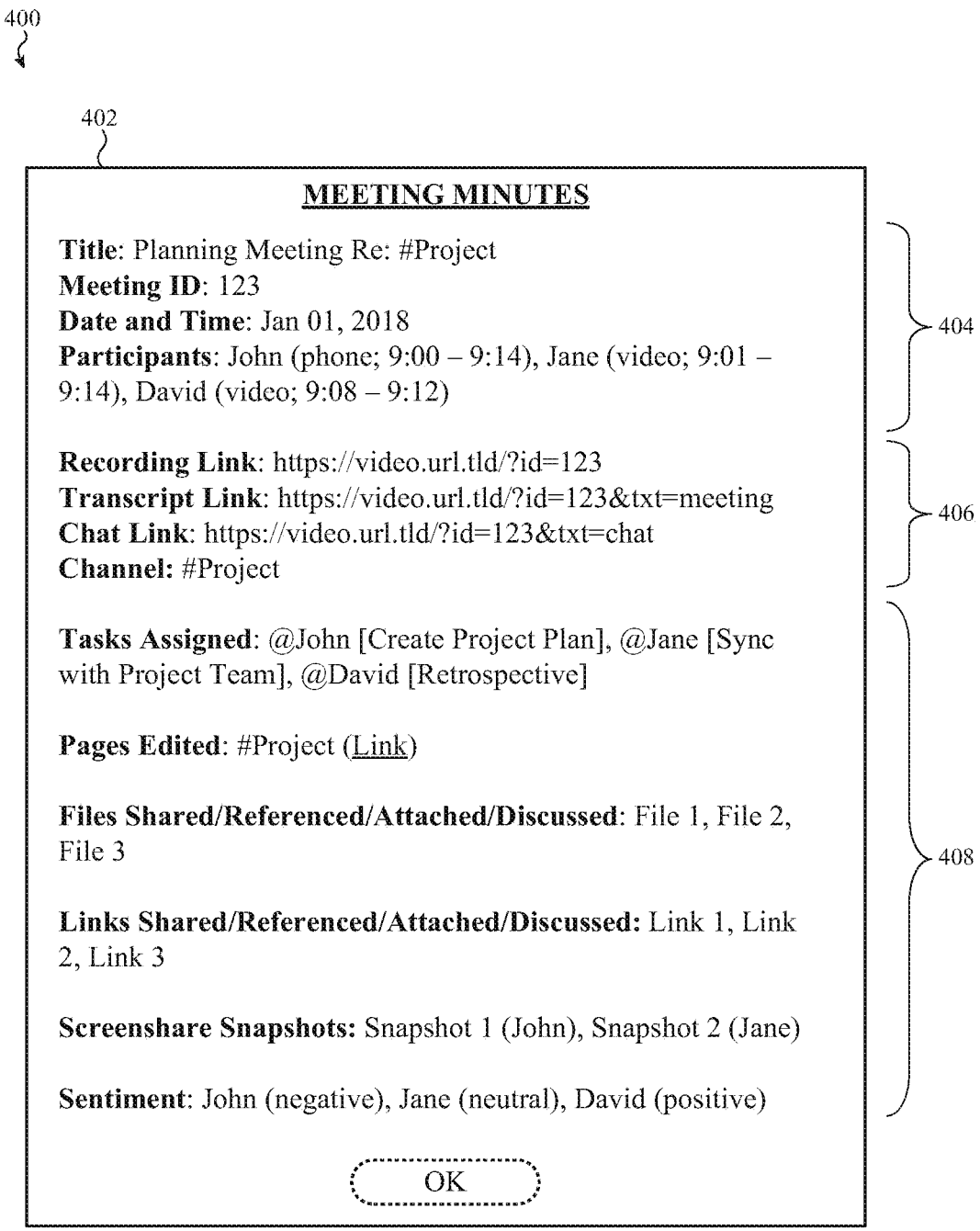
FIG. 4 depicts an active display area of a client device associated with a collaborative work environment, as described herein, rendering a graphical user interface summarizing team-generated content produced during a meeting or event.

FIG. 4 depicts an active display area 400 of a client device associated with a collaborative work environment, as described herein, rendering a graphical user interface 402 summarizing team-generated content produced during a meeting or event. More simply, the graphical user interface 402 depicted in FIG. 4 presents an example summary document that can be generated, automatically, by a bridge service as described herein.

The summary document shown in the graphical user interface 402 includes multiple sections, each of which contain data extracted from a team-generated content item associated with a particular meeting. For example, some data shown in the summary document may have been exchanged in a chat window during the meeting, some of the data may have been appended to an original meeting invite circulated to invitees, some of the data may have been a portion of an updated meeting invite circulated to invitees, some of the data may be extracted from a transcript of the meeting, and so on. It may be appreciated that, in view of the various embodiments described herein, any suitable team-generated content—regardless of form or format—can be parsed and included in a summary document such as shown in FIG. 4.

The summary document shown in the graphical user interface 402 includes a first section 404 that memorializes bibliographic information about a specific meeting, including a meeting title, a meeting ID, the date and time of the meeting, participants in the meeting, how various attendees joined the meeting and/or participated therein, and so on. It may be appreciated that these examples are not exhaustive; in other cases, other information can be included. Examples include, but are not limited to: invitees; attendees; meeting host; meeting presenters; and so on.

The summary document shown in the graphical user interface 402 also includes a second section 406 that memorializes records of the meeting itself. For example, the second section may include a link to a video recording of the meeting, an audio recording of the meeting, a transcript of the meeting, a chat log of the meeting, diagnostic logs generated during the meeting, other communication channels used by participants during the meeting, and so on. As with foregoing examples, it may be appreciated that these examples are not exhaustive; in other cases, other information can be included. Examples include, but are not limited to: transcript translations; languages spoken; number of speakers; percentage of time various speakers occupied; number/identity of participants who did not speak; and so on.

The summary document shown in the graphical user interface 402 also includes a third section 408 that includes and/or links to other actions taken by the bridge service during the meeting. This may include interactions between the bridge service and other collaboration tools (e.g., tasks assigned, issues added, documents created, and so on). This may also include physical document referenced and/or attached that were referenced in the meeting. This may also include documents reviewed during the meeting during a screen-sharing session. As with foregoing examples, it may be appreciated that these examples are not exhaustive; in other cases, other information can be included. Examples include, but are not limited to: speaker general meeting sentiment; speaker/attendee tone; similarity score of meeting with respect to previous meetings; suggestions to schedule a follow-up meeting; and so on.

These foregoing embodiments depicted in FIG. 3-4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
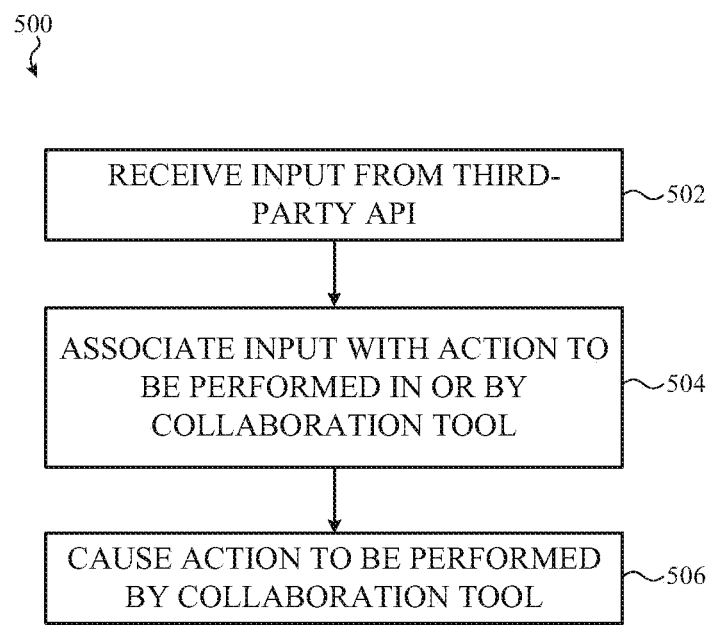
FIG. 5 is a flowchart depicting example operations of a method of operating a bridge service and/or one or more input classifiers or content analyzers, such as described herein.

FIG. 5 is a flowchart depicting example operations of a method of operating a bridge service and/or one or more input classifiers or content analyzers, such as described herein. The method 500, as with other methods described herein can be performed in whole or in part by a bridge service. More particularly, at least a portion of the method 500 can be performed by a processor allocation and/or a memory allocation associated with a server dedicated, at least in part, to execution of an instance of a bridge service as described above.

The method 500 includes operation 502 at which an input, input event, or other trigger is received from a third-party API endpoint. The input can be received in any form or format, at may be structured or unstructured. The input event typically includes at least one item, or metadata item, that constitutes team-generated content as described above.

The method 500 includes operation 504 at which the input received at operation 502 is associated with an action to be performed in or by a collaboration tool. More particularly, the input can be provided to an input classifier and/or a parser in order to determine whether the input is or contains (1) a team-generated content item that should be stored and/or summarized in a summary document generated by a bridge service as described above and/or (2) corresponds to an interaction schema of a collaboration tool. Thereafter, at operation 506 the bridge service causes the action associated with the input to be performed. More specifically, the bridge service either (1) appends the content item associated with the input to a summary document as described above or (2) provides the input event or content item as input to an associated collaboration tool.

Figure 6:
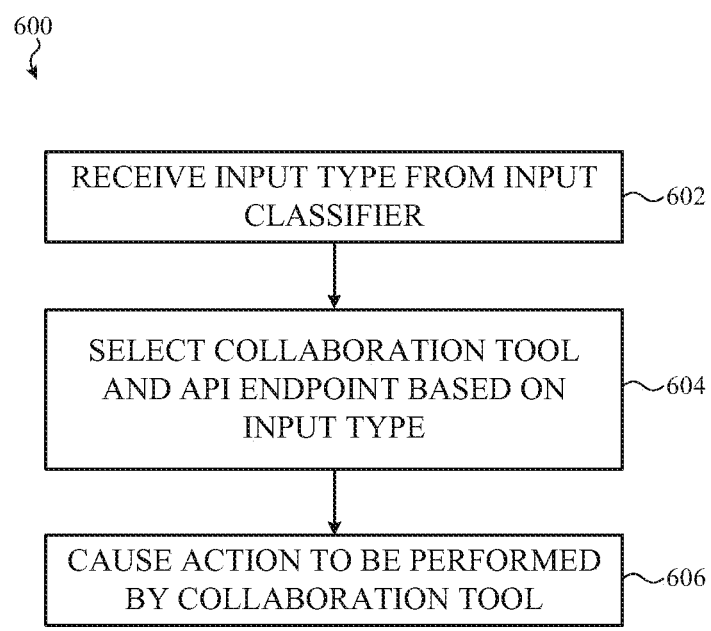
FIG. 6 is a flowchart depicting example operations of a method of operating a bridge service and/or one or more input classifiers or content analyzers, such as described herein

FIG. 6 is a flowchart depicting example operations of a method of operating a bridge service and/or one or more input classifiers or content analyzers, such as described herein. As with method 500 of FIG. 5, the method 600 can be performed in whole or in part by a bridge service. More particularly, at least a portion of the method 600 can be performed by a processor allocation and/or a memory allocation associated with a server dedicated, at least in part, to execution of an instance of a bridge service as described above.

Figure 7A:
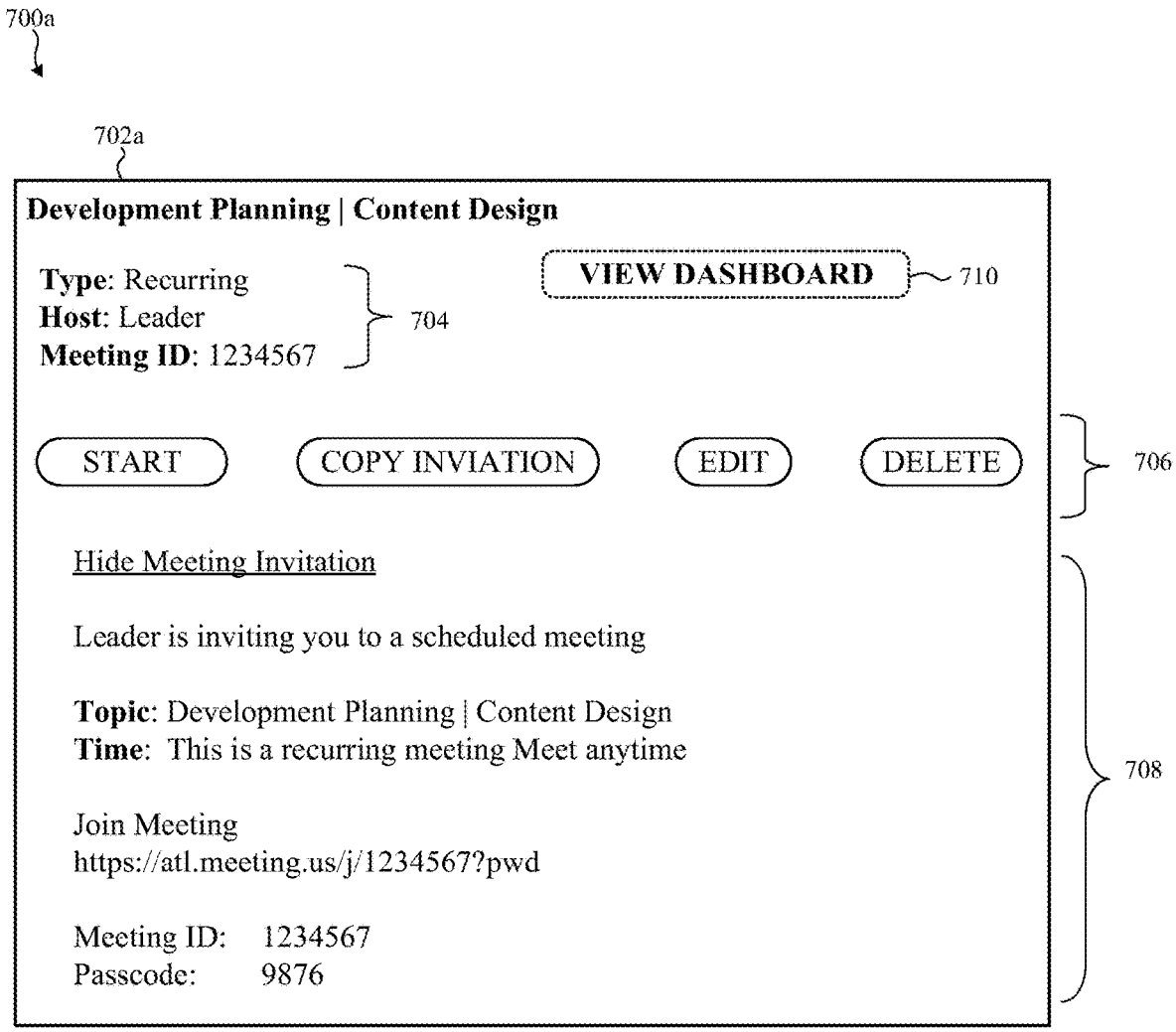
FIGS. 7A-7B depict active display areas of a client device associated with a collaborative work environment, as described herein, rendering a graphical user interface defining one or more user interface elements that can be leveraged by a user to retrieve information related to the status of one or more tasks.
Figure 7B:
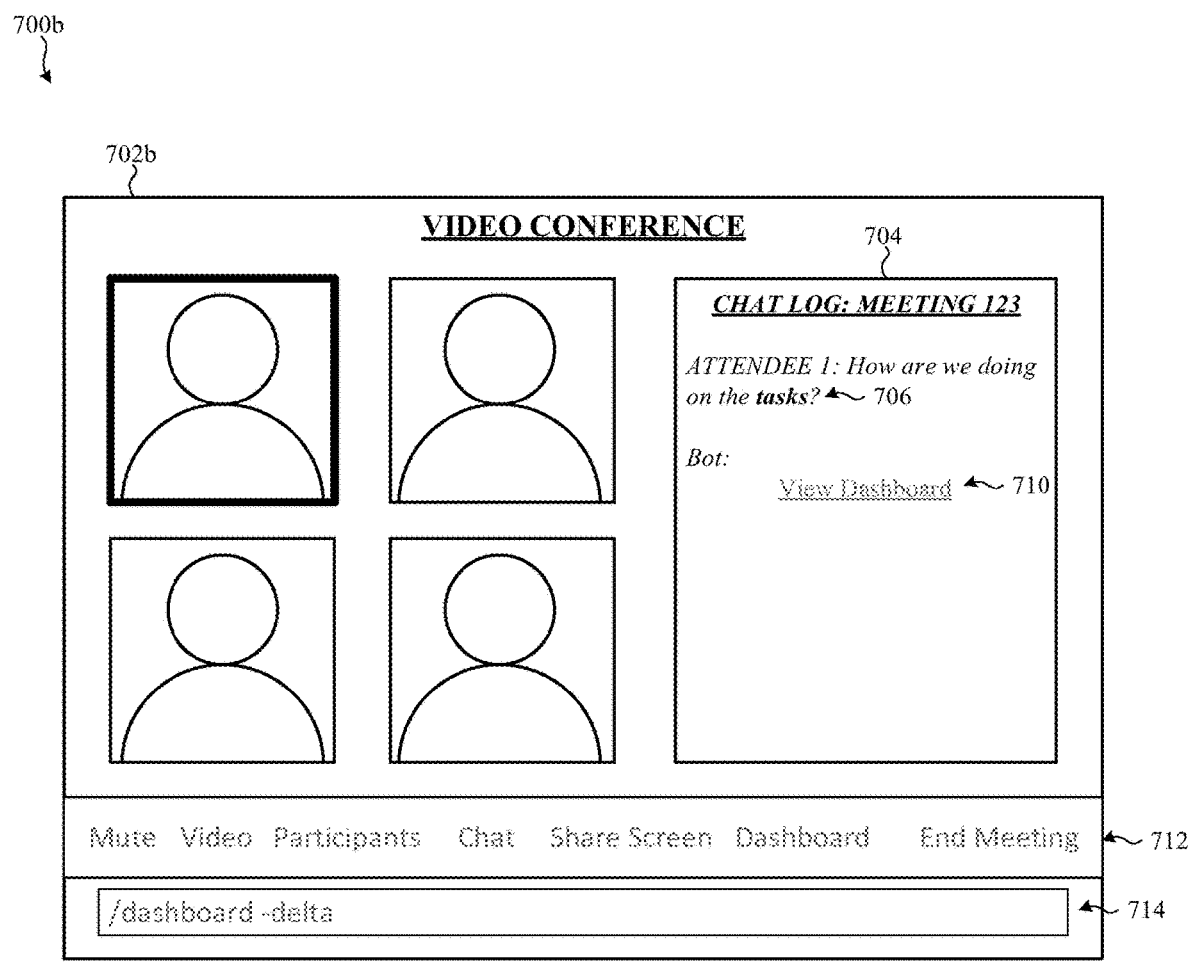

The method 600 includes operation 602 at which an input type is received from an input classifier, such as the input classifier referenced with respect to FIG. 2. Thereafter, at operation 604, a collaboration tool can be selected from a set of collaboration tools based on the input type. In addition (or alternatively) an API endpoint of the selected collaboration tool can likewise be selected based on the input type. Finally, at operation 606, an action can be performed, such as submitting a request object and/or other input to the selected API endpoint of the selected collaboration tool FIGS. 7A-7B depict active display areas 700 of a client device associated with a collaborative work environment. The client device is depicted as rendering a graphical user interfaces 702 defining one or more user interface elements that can be leveraged by a user to inform behavior of a bridge service, as described herein.

FIG. 7A shows an example of a graphical user interface 702a implemented in a calendar event that can be provided to participants of the meeting. For example, in the illustrated embodiment, the graphical user interface 702a includes a summary section 704 that includes meeting information such as a type of meeting, one or more hosts of the meeting and/or a meeting identification (ID). In this example, the type of meeting can indicate that it is a recurring meeting, the host information can include a name, username or other identification of a host(s) responsible for creating, running or otherwise facilitating the meeting. The meeting identification can include a unique ID which can be used by participants to identify and access the meeting.

In some cases, a portion of the meeting ID may be displayed in the user interface 702a, and other portions of the meeting ID can be stored in metadata, which may not be displayed to the user. For example, a meeting ID can include a series ID that is used to identify the recurring meeting, which may or may not be the same as the displayed meeting ID which is used to access a meeting. Additionally or alternatively, the meeting ID can include an instance ID which uniquely identifies each meeting in the series. In other cases, the meeting ID can be formatted to indicate information about the meeting such as a date, time, topic, or other information about the meeting.

The graphical user interface 702a can also include options 706 for controlling and/or editing the meeting. In some cases, one or more of these options may only be available to a particular user such as a host or organizer of the meeting. The graphical user interface 702a can further include meeting details 708, which can include information such as a title of the meeting, a link that can be used to join the meeting, a meeting ID and/or passcode which may be used to access the meeting, and so on.

The graphical user interface 702a can also include a user interface element 710 that is used to activate the bridge service which retrieves information from a collaboration service such as a task management system and analyzes that information to provide one or more graphical summaries to participants during a meeting. In some cases, when a user interacts with the user interface element 710, through their client device, this can cause the bridge service to receive and/or retrieve information about the particular meeting such as a meeting ID, which can include a series ID and/or an instance ID, information about one or more participants in the meeting, and so on. This information can be used by the bridge service to access the one or more collaboration services and retrieve information related to the meeting and/or particular instance of the meeting from the collaborations service(s). In this regard, the user interface element 710 can be leveraged by the user to receive and/or view information from a collaboration service directly in the third-party meeting service.

It may be appreciated that the foregoing simplified example graphical user interface is merely one example means by which a system as described herein can incorporate more information into a meeting invitation to assist with functionality of a bridge service such as described herein.

Regardless of form or format of a graphical user interface presented to participants of a meeting, it may be appreciated that the data added to that invite is team-generated content, such as described herein and can therefore be consumed by a bridge service to (1) generate a summary document and/or (2) to extend one or more user interface interaction schemas associated with a collaboration tool to the third-party meeting tool.

FIG. 7B shows an example of a graphical user interface 702b that includes a chat interface 704 that is provided to participants of a meeting by the third-party service. The graphical user interface 702b is an example of an interface provided by a third-party meeting tool during a meeting between various participants. The chat interface 704, as described herein, can display messages exchanged between users of the meeting. In some cases, messages entered into a text entry filed 714 can be displayed in the chat interface 704 and/or used to activate a bridge service to provide information from one or more collaborations services directly in the current meeting. For example, text input 706 into the text entry field 714 can be received as a user input event by a bridge service, as described herein. The bridge service can parse the text input 706 and analyze the text input to identify a function associated with the text input 706. In other cases, the video conference can include a control bar 712 that has various controls for the meeting. The control bar can include a Dashboard function (e.g., "Dashboard") that can cause a graphical summary to be displayed and/or provide additional functions related to displaying graphical summaries generated by the bridge service. Selection of the Dashboard function in the control bar and/or associated options can be passed by the video conference service and to the bridge service, and can be used by the bridge service to retrieve data, perform specific analysis related to the selected function and return a graphical summary for display in the video conference service.

In some cases, the text entry field 714 can function as a command line control from the bridge service. For example, the input text 706 may include a command designated by a special character or string of characters that can be used to designate the input text 706 as a command-line input. An example command-line input may include a special character (e.g., forward slash "/," backslash "\," at sign "@") followed by a command line string designating the command (e.g., "/dashboard"). The command-line input may also include one or more arguments that specify a format or type of dashboard to be presented (e.g., "/dashboard-standard" or "/dashboard-delta"). In this regard, commands for the bridge service can be entered into the text entry field to cause the bridge service to perform specific functions. In some cases, the commands can be identified based on a specific format of the text, special characters, or other command designations that are identified by the video conferencing application as a command and then relayed by the bridge service. The commands can cause the bridge service to perform different functions such as to generate a default set of graphical summaries for display in the video conference application. In some cases, the format and/or content of the command can indicate a specific type summary or data that a user wants to see. For example, a meeting participant can input a command to view data to a specific set of users, and in response to receiving this command, the bridge service can make API calls to one or more third party services and/or analyze meeting data to generate the requested graphical summary.

With reference to the preceding example, the bridge service may process the text input 706 and identify the "tasks" term as a functional input associated with a task management system. In response to identifying the functional "tasks" term, the bridge service can initiate interactions with the third-party meeting tool and/or the task management system to perform a function associated with the functional term. For example, the "tasks" term can be used to initiate a task summary process for providing updates related to tasks and/or issues associated with the current meeting. In some cases, the bridge service can cause the third-party meeting tool to display the user interface element 710 in the chat log 704. With respect to these examples, the user interface element 710 can be an active element such as a hyperlink that can be selected by one or more of the meeting participants. As described herein, the user interface element 710 can cause the bridge service to retrieve information from a task management system and analyze that information to provide one or more graphical summaries to participants during a meeting.

In response to receiving a command, or other input, the video conferencing platform can be configured to pass the commands or an indication of the command to the bridge service from processing. In some cases, the bridge service can establish a communication session or communication link with the video conferencing platform to receive, retrieve or otherwise monitor for these commands. The bridge service may communicate with the video conferencing platform using a series of API calls or other structured communication protocol. As discussed previously, the bridge service may also communicate with one or more third-party services using a series of API calls, which may be constructed based on information obtained from the video conferencing platform. For example, in response to receiving a command the bridge service is configured to construct one or more API calls to a third-party service, such as a task management and/or issue tracking service. The API calls can be constructed based on data obtained from the meeting session, such as using a meeting ID, a meeting instance ID, IDs of one or more of the meeting participants, IDs for specific issues, projects, teams, and so on. In response to submitting the API call, the bridge service can receive data associated with a set of issues that are relevant to the particular meeting. For example, the received data can include information related to issues associated with the meeting ID, the instance ID, one or more user IDs and so on. The bridge service can analyze the received data to generate the graphical summaries.

In some embodiments, the bridge service can analyze the data received from the third-party system and compare that data with data for a previously collected set of issues, for example, issues from a prior instance of a recurring meeting. The analysis can parse each set of issues to identify specific fields or content that is relevant to the graphical summaries and compute updated analytics. For example, the bridge service can identify issues that have had a status change between a current instance of the meeting and previous instance of the meeting and generate a graphical summary showing these changes. In other cases, the bridge service can identify issues that have not progressed between one or more meeting instances and generate a graphical summary showing this information. In this regard, the bridge service can store information that is related to previous meeting instances and compare it to information related to current meeting instances and retrieved from one or more third party services to generate data about changes to issues between different meeting instances.

An illustrative example can include generating a graphical summary that is based on or identifies issues that have changed status between two meeting instances. During a first meeting instance, a meeting participant may request information related to a specific issue, for example using the video conferencing service, as described herein. In response to receiving the request, the bridge service can construct one or more API calls to an issue tracking system and receive data related to a specific issue that is associated with the meeting. The issue data may include data that indicates that the issue is active and currently being worked on. The bridge service can store this information in a format associated with the meeting (e.g., the meeting ID). At a next instance of the meeting, the bridge service may receive another request for information related to that specific issue and construct another API call to the issue tracking system and receive data related to that same issue. The issue data can indicate that the issue is closed and has been completed. The bridge service can compare the current issue status (e.g., closed) to the previous issue status that it has stored (e.g., active) and determine that the status has changed between the previous meeting and the current meeting. In response, the bridge service can generate a graphical summary that identifies the issue and indicates that is has been updated from an active status to a closed status since the last meeting. In this regard, the bridge service can be configured to generate data about changes to issues and/or tasks between meetings that may not be available directly from the third-party service.

In some cases, the bridge service can be configured to correlate data received from a video conferencing platform with data stored at a third-party platform that is not otherwise cross-correlated. For example, a meeting participant may have a first ID (or set of credentials) that are used to access the meeting platform and an independent second ID (or set of credentials) that are used to access a third-party system such as a task management or issue tracking system. In this regard, the bridge service can associate a specific meeting participant with a user ID related to one or more issues in a third-party service. For example, the bridge service can be configured to updated tasks or issues in a third-party service, via one or more API calls, with the first ID that is used to access and participate in the meeting. In some cases, the bridge service can store this information independent of the meeting service and/or third-party service(s) and use it to correlate users when analyzing task data and generating graphical summaries.

Figure 8:
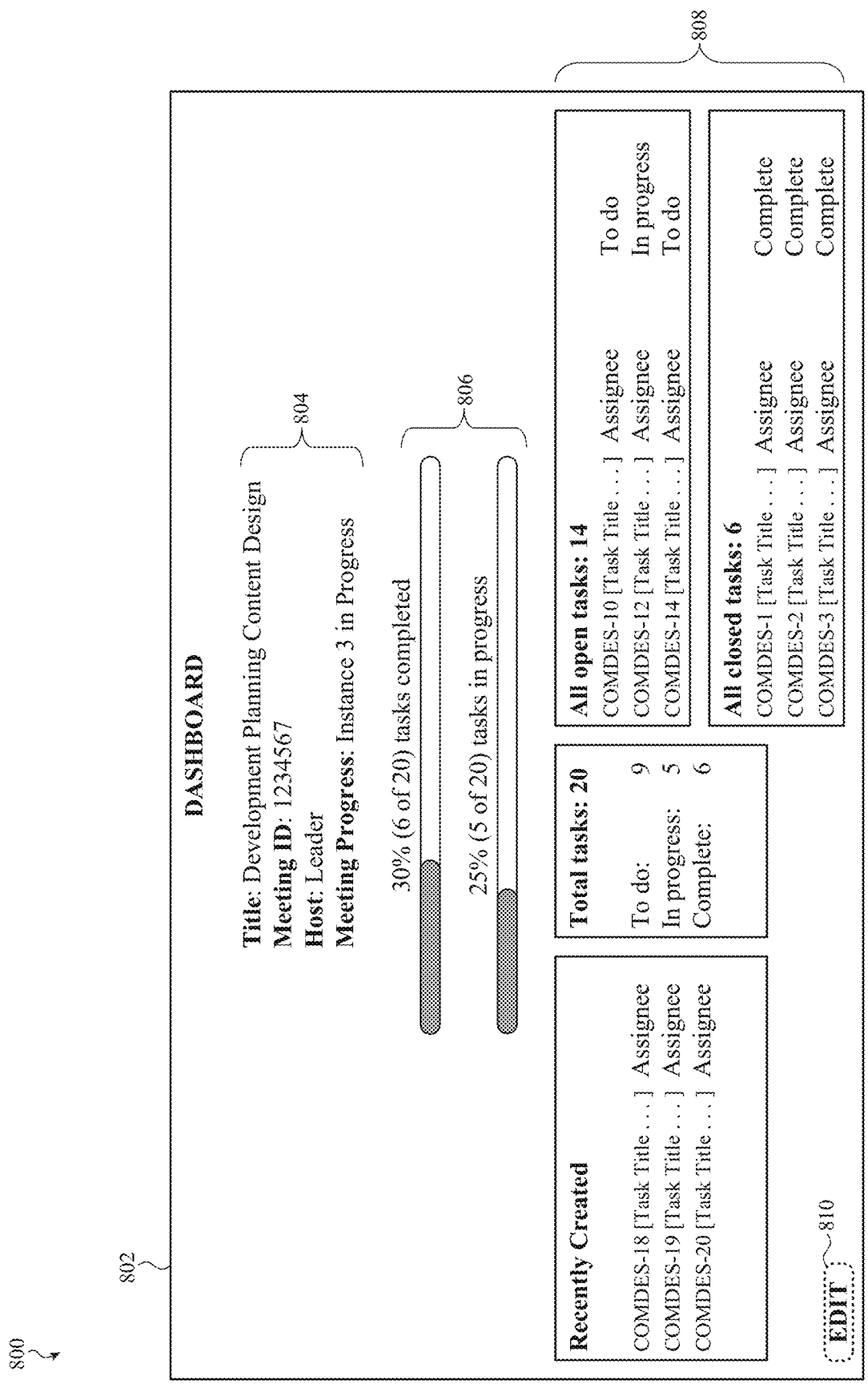
FIG. 8 depicts an active display area of a client device associated with a collaborative work environment, as described herein, rendering a graphical user interface showing a dashboard that provides information related to one or more tasks.

FIG. 8 depicts an active display area 800 of a client device associated with a collaborative work environment, as described herein, rendering a graphical user interface showing a dashboard that provides information related to one or more tasks. The client device is depicted as rendering a graphical user interface 802 defining a dashboard showing information related to one or more task associated with a current meeting. The dashboard can be displayed by a third-party meeting tool during a meeting and in response to a user selecting an interactive user element as described herein. The dashboard can include one or more graphical summaries that are generated by the bridge service based on information retrieved from a collaboration service such as a task management system, an issue tracking system and/or the like. In some cases, the bridge service uses information about a current meeting and received from the third-party meeting tool to retrieve data from the collaboration tool and generate the dashboard.

The dashboard illustrated in the graphical user interface 802 can include data related to task and/or issues that are associated with the current meeting. For example, the dashboard can include a summary section 804, which can provide information about the current meeting such as a title, meeting ID, host information, and meeting progress in the case of recurring meetings. This summary section 804 can include information from the third-party meeting tool.

The dashboard can also include a first set of graphical summaries 806 that provide higher level information related to overall progress of one or more task associated with a meeting. In some cases, the first set of graphical summaries 806 can be based on analysis performed by the bridge service, which uses task data retrieved by the bridge service from one or more collaboration services. For example, the first set of graphical summaries 806 can provide an overview of the progress of all the tasks associated with a particular meeting. The first set of graphical summaries 806 can include text information, visual indicators, and combinations thereof. In the cases of recurring meetings, the bridge service and/or collaboration services can be configured to track tasks across a series of instances. In this regard, the first set of graphical summaries 806 can be updated based on changes between a previous meeting and a current meeting. In some cases, the first set of graphical summaries 806 can include information showing a change in the status between a current meeting and one or more previous meetings such as changes to the status of one or more tasks between two subsequent meetings. For example, a visual indicator and/or text summary can include information that indicates how many tasks have been completed since the last meeting, how many tasks have been started since the last meeting, how many new tasks have been opened since the last meeting or a combination thereof.

The dashboard can also include a second set of graphical summaries 808 that provide more detailed information about specific tasks summarized by the first set of graphical summaries 806. For example, the second set of graphical summaries can include various panes, which present additional task information. This can include a "Recently Created" pane that lists specific tasks that have been recently created and associated with the meeting such as "COMDES-18." Additional this information can include additional information such a participant or team that is assigned to the task (designated by "Assignee"), and the like.

The bridge service can provide functionality for customizing the type of information displayed by the dashboard. In some cases, selection of a user interface element for displaying the dashboard can result in a default set of information and layout of the dashboard. The bridge service can be configured to allow a user to add, remove, change or otherwise customize the information displayed by the dashboard. For example, the dashboard can include an option to edit the display 810, which can allow a user to choose to add additional information which may be stored as templates by the bridge service, remove current information, create custom displays and/or the like.

Figure 9:
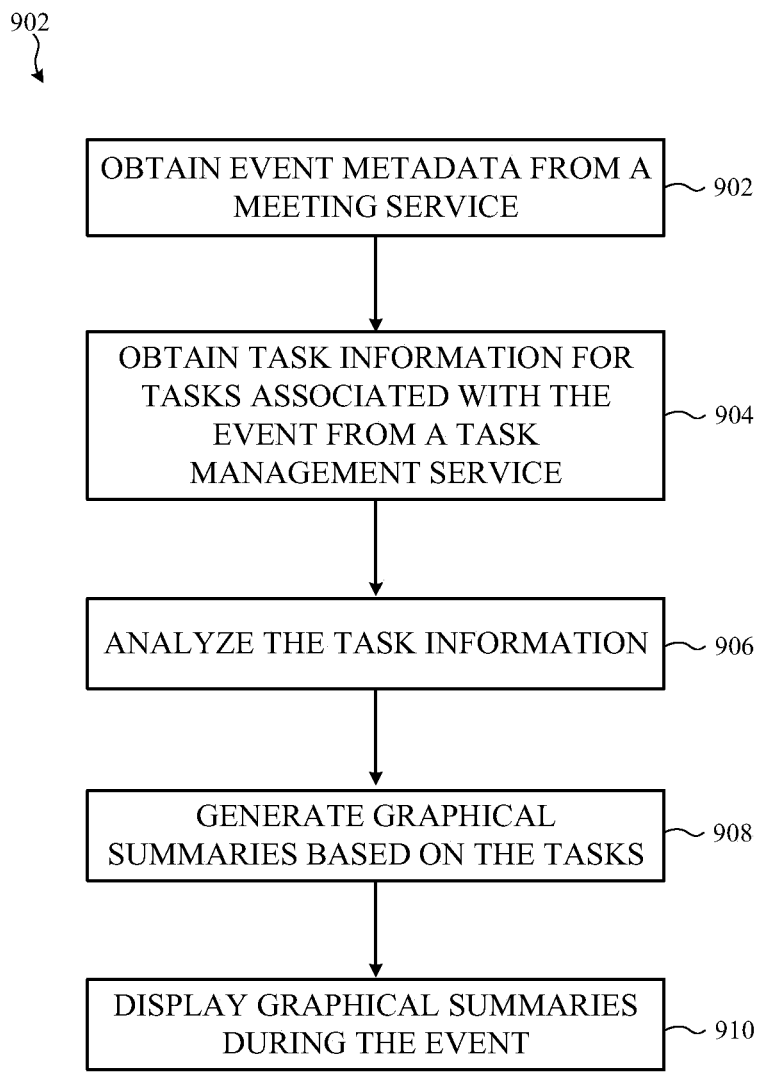
FIG. 9 is a flowchart depicting example operations of a method of operating a bridge service for retrieving and displaying information related to task managed by one or more collaboration tools, as described herein.

FIG. 9 is a flowchart depicting example operations of a method of operating a bridge service for retrieving and displaying information related to task managed by one or more collaboration tools, as described herein. The method 900, as with other methods described herein can be performed in whole or in part by a bridge service. More particularly, at least a portion of the method 900 can be performed by a processor allocation and/or a memory allocation associated with a server dedicated, at least in part, to execution of an instance of a bridge service as described above.

At step 902, the method 900 includes obtaining event metadata from a third-party meeting tool, such as described herein. In some cases, the bridge service can access an API endpoint of the third-party meeting tool to obtain event metadata related to a meeting from the third-party meeting tool. The bridge service can access the API endpoint of the third-party meeting tool in response to a meeting being started. In some cases, the bridge service can cause a user interface element for displaying a summary dashboard, as described herein, to be displayed in a meeting being hosted by the third-party meeting tool. Causing the user interface element to be displayed can indicate to meeting participants that the bridge service is active and allow the participants to request information related to one or more collaborations services.

The event metadata can include meeting ID for a current meeting. As described herein the meeting ID can include information that identifies a meeting series along with, which instance the current meeting is in the meeting series. For example, the meeting ID can include a series ID which uniquely identifies a recurring meeting dedicated to particular topic (e.g., "Development Planning Content Design" shown in FIG. 7A). The instance ID can identify which meeting a currently active meeting is, such as identifying that it is the third meeting instance of the series. The event metadata can include addition information about the meeting such as identities of meeting participants, such as participants that have joined a current meeting, participants that are invited but have not joined the meeting, and so on. In some cases, the event metadata can include other information such as host information, meeting passwords, team information such as identifying specific development teams, business departments, or the like.

At step 904, the process 900 can include the bridge service using the event metadata obtained from the third-party meeting service to obtain task information from tasks associated with meeting and stored at a task management service such as an issue tracking system. In some cases, this can include the bridge service accessing an API endpoint of the task management service to obtain task information related to the current meeting.

The task information stored at the task management service can be associated with the meeting in a variety of ways. In some cases, when a task is created during a meeting, as described herein, the task can include the meeting ID, which is stored in the task management service. For example, the meeting ID can be included as part of the label field for the task at the task management system. In other cases, the meeting ID can be stored in other fields such as a custom field, which can have defined permissions such as read-only attributes. In other cases, the bridge service can be configured to associate a meeting ID with tasks that are already created and/or pending in the task management system. For example, the bridge service can be configured to identify a task discussed during a meeting (e.g., from transcript data) or entered into a chat log, and populate, in the task management system, the identified task with meeting data such as the meeting ID. In other cases, the bridge service can be configured to interface with the task management system and pull meeting information such as the meeting ID from the third-party meeting app and associate it with a task in the task management system.

The task information can include in data related to task associated with the current meeting such as the status of each task indicating whether a task is complete, in progress or needs to be started (e.g., future task), and/or the like. In some cases, the task information can include a task ID that is generated by the task management system and used to uniquely identify the task at the task management system. The task information can include title information, information about who the task is assigned to (e.g., individuals, team, business unit, or the like), a type of task, notes, date information such as when it was created, started, closed, and so on.

In some cases, the task information can be based on data obtained from a current meeting instance and/or prior meeting instances. For example, the bridge service can identify a set of active participants in a meeting and generate data sets that are targeted to those current participants. For example, the bridge service may identify meeting invitees that are not participating in the current meeting and adjust the graphical summaries accordingly, which can include generating graphical summaries related to tasks and/or issues for the current participants. In other cases, the meeting service can provide the bridge service with text provided in a chat interface, and the bridge service can use that to retrieve issue data from third party services, generate new tasks, identify updates to task and/or issues, and so on. In some cases, the bridge service can analyze chat, voice, or other meeting data and generate graphical summaries or other data for display in the meeting service. For Example, if the meeting participants are discussing a particular task, the bridge service can identify that task from the chat, voice, or other data and retrieve data from a third-party service related to that task. In this regard, the bridge service can identify particular tasks or issues from meeting content and generate graphical summaries relevant to those issues.

At step 906, the process 900 can include the bridge service analyzing the task information to determine a status of the tasks and/or other information about the tasks. Analyzing the task information can include processing the task information to generate one or more parameters based on the task information. For example, the task information for tasks associated with a current meeting can be used to determine how many tasks are associated with the meeting, how many of those tasks are complete, pending, need to be started, and so on. In this regard, the bridge service can aggregate task data related to a specific meeting and derive one or more metrics from that specific set of task data. In some cases, the bridge service can compare task data for a current meeting instance to task data from one or more previous meeting instances. This comparison can be used to determine how long tasks have been at a specific status (e.g., pending, waiting to be started, etc.), whether tasks are meeting projected deadlines, efficiency metrics, determine future dates such as an estimated completion date for a project, and so forth. In some cases, the bridge service can use this analysis to identify tasks that are behind schedule, ahead of schedule, and on track. The bridge service can perform statistical analysis on the task data. Additionally or alternatively, the bridge service can analyze the task information to determine task dependencies such as tasks that cannot be started until another task is complete.

At step 908, the process 900 can include using the analyzed task information to generate one or more graphical summaries of the task data. For example, the graphical summaries can be generated to communicate the task metrics generated at step 906 to participants of the meeting via the third-party meeting tool. The graphical summaries can include the results of statistical analysis such as completion percentages, or other data related to one or more tasks associated with the meeting, such shown in FIG. 8.

At step 910, the process 900 can include causing the third-party meeting tool to display the graphical summaries as part of a current meeting. In some cases, displaying the graphical summaries can be in response to a participant selecting an option to view the dashboard summary, as described herein. The bridge service can be configured to format the graphical summaries for display in the third-party meeting tool, which include saving the graphical summaries and associated layout data in formats that are displayable by the third-party meeting tool. In some cases, the bridge service can be configured to save custom formats for displaying graphical summaries for specific meetings. For example, the bridge service can associate a particular format and/or types of information to be presented in the graphical summaries with a particular meeting ID. This format data can be managed by the bridge service, associated with a particular meeting at the third-party meeting tool, saved at one or more collaboration platforms, or a combination thereof.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it may be appreciated that the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. A method of operating a bridge service for displaying task details in a third-party meeting service, the method comprising:
   accessing, by the bridge service, a first application programming interface (API) endpoint of the third-party meeting service during an event defined by the third-party meeting service to obtain event metadata from the third-party meeting service;
   accessing, by the bridge service, a second API endpoint of a task management service during the event to obtain, using the event metadata from the first API, task information for tasks associated with the event and stored at the task management service;
   analyzing the task information to determine a status of the tasks;
   generating, using the status of the tasks, one or more graphical summaries of the tasks associated with the event;
   causing, by the bridge service, the third-party meeting service to display a user interface element; and
   in response to a meeting participant selecting the user interface element, the bridge service causes the one or more graphical summaries to be displayed by the third-party meeting service during the event.

2. The method of claim 1, wherein:
   the event metadata comprises a meeting identification number that comprises a series identification for the event and an instance identification;
   the series identification comprises a unique identifier of the event with respect to other events hosted by the third-party meeting service; and
   the instance identification comprises a unique identifier of an instance of the event with respect other instances of the event.

3. The method of claim 1, wherein:
   the event is a current event; and
   the bridge service compares the task information for the current event to a previous task information for a previous event to determine changes to the status of the tasks between the event and the previous event.

4. The method of claim 3, wherein the one or more graphical summaries comprises task progress updates based on the determined changes to the status of the tasks between the event and the previous event.

5. The method of claim 1, wherein the user interface element is displayed as part of a calendar event associated with the event.

6. The method of claim 1, further comprising:
   detecting, in a chat log associated with the event, a functional text input associated with the task management service; and
   in response to detecting the functional text input, causing the third-party meeting service to display the user interface element in the chat log.

7. The method of claim 1, wherein the one or more graphical summaries comprise information related to completed tasks, information related to in-progress tasks, information related to future task, or a combination thereof.

8. A method of operating a bridge service to update task details at a task management program based in input received at a third-party meeting service, the method comprising:
   accessing, by the bridge service, an application programming interface (API) endpoint of a task management service during an event defined by the third-party meeting service to obtain task information associated with the event from the task management service;
   in response to obtaining the task information:
      analyzing the task information to determine a status of one or more tasks included in the task information;
      generating, using the status of the one or more tasks, one or more graphical summaries of tasks associated with the event; and
      causing the one or more graphical summaries to be displayed by the third-party meeting service during the event;
   monitoring, during the event, an API endpoint of the third-party meeting service, for user input related to the task information;
   in response to receiving the user input:
      analyzing the user input to identify a request to create a new task in the task management service; and
      in response to receiving the request to create the new task, sending a task creation request to the task management service, the task creation request including the user input and an event identification generated by the third-party meeting service for the event.

9. The method of claim 8, wherein the one or more graphical summaries comprise information related to completed tasks, information related to in-progress tasks, information related to future task, or a combination thereof.

10. The method of claim 8, wherein receiving the request to create the new task comprises identifying a text-based command in a chat feature of the third-party meeting service.

11. The method of claim 10, wherein the text-based command comprises a text string that is formatted according to a defined format for the task management service.

12. The method of claim 10, wherein the text-based command comprises an indication of a participant assigned to the new task and a title for creating the new task in the task management service.

13. The method of claim 8, further comprising:
   receiving, by the bridge service and from the task management service, a confirmation that the new task was created at the task management service; and
   in response to receiving the confirmation, updating the task information to include the new task.

14. The method of claim 13, wherein updating the task information comprises causing, by the bridge service, the third-party meeting service to display the updated task information during the event.

15. A server system comprising:
   a memory allocation defined by:
      a data store storing an executable asset; and
      a working memory allocation;
   a processor allocation configured to load the executable asset from the data store into the working memory to instantiate an instance of a bridge service configured to:
      communicably couple to an application programming interface (API) endpoint of a third-party videoconferencing platform;
      communicably couple to a task management service;

obtain event metadata from the third-party videoconferencing platform for an event being hosted by the third-party videoconferencing platform;

use the event metadata from the third-party videoconferencing platform to obtain task information for tasks associated with the event and stored at the task management service;

analyze the task information to determine a status of the tasks;

compare the task information for the event to previous task information for a previous event:

in response to comparing the task information, determine changes to the status of the tasks between the event and the previous event;

generate, using the status of the tasks and the changes to the status of the tasks, one or more graphical summaries of the tasks associated with the event; and in response to generating the one or more graphical summaries, cause the one or more graphical summaries to be displayed by the third-party videoconferencing platform during the event.

16. The server system of claim 15, wherein obtaining event metadata comprises receiving a meeting identification associated with the event.

17. The server system of claim 16, further comprising, identifying, using the meeting identification, an event identification that uniquely identifies the event with respect to other events and an instance identification that uniquely identifies an instance of the event.

* * * * *